(12) United States Patent
Niedermeyer

(10) Patent No.: US 11,646,453 B2
(45) Date of Patent: *May 9, 2023

(54) NANOPARTICLE COMPOSITIONS AND METHODS FOR ENHANCING LEAD-ACID BATTERIES

(71) Applicant: EVOQ NANO, INC., Salt Lake City, UT (US)

(72) Inventor: William H. Niedermeyer, West Jordan, UT (US)

(73) Assignee: ATTOSTAT, INC., North Salt Lake, UT (US)

( * ) Notice: Subject to any disclaimer, the term of this patent is extended or adjusted under 35 U.S.C. 154(b) by 2 days.

This patent is subject to a terminal disclaimer.

(21) Appl. No.: 17/216,996

(22) Filed: Mar. 30, 2021

(65) Prior Publication Data

US 2021/0226259 A1 Jul. 22, 2021

Related U.S. Application Data

(63) Continuation-in-part of application No. 16/202,078, filed on Nov. 27, 2018, now Pat. No. 11,018,376.

(Continued)

(51) Int. Cl.
*H01M 10/08* (2006.01)
*H01M 4/56* (2006.01)
(Continued)

(52) U.S. Cl.
CPC ......... *H01M 10/08* (2013.01); *H01M 4/5825* (2013.01); *H01M 4/628* (2013.01); *H01M 2300/0011* (2013.01)

(58) Field of Classification Search
CPC .... H01M 10/08; H01M 4/5825; H01M 4/628; H01M 2300/0011
See application file for complete search history.

(56) References Cited

U.S. PATENT DOCUMENTS 3,133,023 A 5/1964 Vogel
4,121,017 A 10/1978 Dougherty et al.
(Continued)

FOREIGN PATENT DOCUMENTS

CA 2560837 A1 3/2007
CN 101128550 A 2/2008
(Continued)

OTHER PUBLICATIONS

Hamada et al., Espacenet machine translation for JP 2006-351465 A (Year: 2006).*

(Continued)

*Primary Examiner* — Adam A Arciero
(74) *Attorney, Agent, or Firm* — Workman Nydegger

(57) ABSTRACT

This disclosure relates to compositions and methods for improving the performance of batteries, such as lead-acid batteries, including reviving or rejuvenating a partially or totally dead battery, by adding an amount of nonionic, ground state metal nanoparticles to the electrolyte of the battery, and optionally recharging the battery by applying a voltage. The metal nanoparticles may be gold and coral-shaped and are added to provide a concentration within the electrolyte of 100 ppb to 2 ppm or more (e.g., up to 5 ppm, 10 ppm, 25 ppm, 50 ppm, or 100 ppm). The metal nanoparticles may be added to battery electrode paste applied to the electrodes to enhance newly manufactured or remanufactured batteries.

18 Claims, 19 Drawing Sheets

Related U.S. Application Data

(60) Provisional application No. 62/674,416, filed on May 21, 2018, provisional application No. 62/591,540, filed on Nov. 28, 2017.

(51) Int. Cl.
*H01M 4/62* (2006.01)
*H01M 4/58* (2010.01)

(56) References Cited

U.S. PATENT DOCUMENTS

| | | |
|---|---|---|
| 4,515,740 A | 5/1985 | Schuettenberg et al. |
| 5,047,448 A | 9/1991 | Tanaka et al. |
| 5,227,608 A | 7/1993 | Yoshida et al. |
| 5,390,864 A | 2/1995 | Alexander |
| 5,585,020 A | 12/1996 | Becker et al. |
| 5,677,075 A | 10/1997 | Fujita |
| 6,051,279 A | 4/2000 | Gualco et al. |
| 6,232,264 B1 | 5/2001 | Lukehart et al. |
| 6,239,453 B1 | 5/2001 | Yamada et al. |
| 6,509,070 B1 | 1/2003 | Voevodin et al. |
| 6,660,379 B1 | 12/2003 | Lakowicz et al. |
| 6,720,006 B2 | 4/2004 | Hanke et al. |
| 7,014,737 B2 | 3/2006 | Harutyunyan et al. |
| 7,252,814 B2 | 8/2007 | De et al. |
| 7,332,351 B2 | 2/2008 | Tan et al. |
| 7,371,457 B2 | 5/2008 | Oldenburg et al. |
| 7,374,730 B2 | 5/2008 | Simard et al. |
| 7,384,560 B2 | 6/2008 | Martens et al. |
| 7,449,679 B2 | 11/2008 | Plewa et al. |
| 7,509,993 B1 | 3/2009 | Turng et al. |
| 7,527,824 B2 | 5/2009 | Becker et al. |
| 7,553,801 B2 | 6/2009 | Alexander et al. |
| 7,625,637 B2 | 12/2009 | Kim |
| 7,662,731 B2 | 2/2010 | Itoh et al. |
| 7,682,970 B2 | 3/2010 | Grigoropoulos et al. |
| 7,700,032 B1 | 4/2010 | Lu et al. |
| 7,884,160 B2 | 2/2011 | Wang et al. |
| 7,967,876 B2 | 6/2011 | Aradi et al. |
| 7,985,367 B2 | 7/2011 | Hiromatsu et al. |
| 8,097,233 B2 | 1/2012 | Porterat |
| 8,435,602 B1 | 5/2013 | Seal |
| 8,490,583 B1 | 7/2013 | Gardenier |
| 8,490,586 B2 | 7/2013 | Ross et al. |
| 8,524,139 B2 | 9/2013 | Toth et al. |
| 8,685,293 B1 | 4/2014 | Coppa et al. |
| 8,709,531 B2 | 4/2014 | Miller |
| 8,802,234 B2 | 8/2014 | Che et al. |
| 8,883,865 B2 | 11/2014 | Difrancesco et al. |
| 8,992,815 B2 | 3/2015 | Hu et al. |
| 9,259,407 B2 | 2/2016 | Baker et al. |
| 9,434,006 B2 | 9/2016 | Niedermeyer |
| 9,463,510 B2 | 10/2016 | Hendi et al. |
| 9,512,377 B2 | 12/2016 | Binder et al. |
| 9,627,713 B2 | 4/2017 | Moganty et al. |
| 9,839,652 B2 | 12/2017 | Tarbet et al. |
| 9,849,512 B2 | 12/2017 | Niedermeyer |
| 9,883,670 B2 | 2/2018 | Niedermeyer |
| 9,885,001 B2 | 2/2018 | Niedermeyer |
| 9,919,363 B2 | 3/2018 | Niedermeyer |
| 10,099,191 B1 | 10/2018 | Lu et al. |
| 10,774,429 B2 | 9/2020 | Tarbet et al. |
| 11,018,376 B2 * | 5/2021 | Niedermeyer ........ H01M 10/12 |
| 2001/0031564 A1 | 10/2001 | Suzuki et al. |
| 2002/0051823 A1 | 5/2002 | Yan et al. |
| 2003/0012686 A1 | 1/2003 | Andresen et al. |
| 2003/0086859 A1 | 5/2003 | Kawakami et al. |
| 2003/0102099 A1 | 6/2003 | Yadav et al. |
| 2003/0108612 A1 | 6/2003 | Xu et al. |
| 2003/0129320 A1 | 7/2003 | Yu |
| 2003/0228525 A1 | 12/2003 | Kozawa et al. |
| 2004/0103936 A1 | 6/2004 | Andriessen |
| 2004/0214001 A1 | 10/2004 | Oldenburg et al. |
| 2005/0061779 A1 | 3/2005 | Blumenfeld et al. |
| 2005/0061785 A1 | 3/2005 | Schroder et al. |
| 2005/0153071 A1 | 7/2005 | Bouvrette et al. |
| 2005/0158506 A1 | 7/2005 | Waki et al. |
| 2005/0247866 A1 | 11/2005 | Plewa et al. |
| 2005/0258149 A1 | 11/2005 | Glukhoy et al. |
| 2005/0260276 A1 | 11/2005 | Yang et al. |
| 2006/0049034 A1 | 3/2006 | Lee et al. |
| 2006/0142853 A1 | 6/2006 | Wang et al. |
| 2007/0003603 A1 | 1/2007 | Karandikar et al. |
| 2007/0029185 A1 | 2/2007 | Tung |
| 2007/0125196 A1 | 6/2007 | Zhong et al. |
| 2007/0140951 A1 | 6/2007 | O'Brien et al. |
| 2007/0141259 A1 | 6/2007 | House et al. |
| 2007/0207335 A1 | 9/2007 | Karandikar et al. |
| 2007/0269576 A1 | 11/2007 | Barton et al. |
| 2007/0287202 A1 | 12/2007 | Maehashi et al. |
| 2008/0006524 A1 | 1/2008 | Liu et al. |
| 2008/0035682 A1 | 2/2008 | Coffey et al. |
| 2008/0044148 A1 | 2/2008 | Robinson et al. |
| 2008/0050448 A1 | 2/2008 | Wilson et al. |
| 2008/0143021 A1 | 6/2008 | Ehrentraut et al. |
| 2008/0161631 A1 | 7/2008 | Axtell et al. |
| 2008/0241490 A1 | 10/2008 | Newman et al. |
| 2008/0263940 A1 | 10/2008 | Parish et al. |
| 2008/0292673 A1 | 11/2008 | Crudden |
| 2009/0000186 A1 | 1/2009 | Sanders et al. |
| 2009/0028947 A1 | 1/2009 | Rahman |
| 2009/0039316 A1 | 2/2009 | Hirai et al. |
| 2009/0061230 A1 | 3/2009 | Berkei et al. |
| 2009/0104179 A1 | 4/2009 | Boyden et al. |
| 2009/0117268 A1 | 5/2009 | Lewis et al. |
| 2009/0148484 A1 | 6/2009 | Lin et al. |
| 2009/0175948 A1 | 7/2009 | Jiang et al. |
| 2009/0191288 A1 | 7/2009 | Squires |
| 2009/0214766 A1 | 8/2009 | Magdassi et al. |
| 2009/0246530 A1 | 10/2009 | Murakami et al. |
| 2010/0040655 A1 | 2/2010 | Ren et al. |
| 2010/0050872 A1 | 3/2010 | Lee |
| 2010/0068299 A1 | 3/2010 | Van et al. |
| 2010/0072645 A1 | 3/2010 | Hiromatsu et al. |
| 2010/0080957 A1 | 4/2010 | Chinn et al. |
| 2010/0092367 A1 | 4/2010 | Porterat |
| 2010/0154591 A1 | 6/2010 | Islam |
| 2010/0167958 A1 | 7/2010 | Lin et al. |
| 2010/0172997 A1 | 7/2010 | Omary et al. |
| 2010/0180413 A1 | 7/2010 | Jeong |
| 2010/0183739 A1 | 7/2010 | Newman |
| 2010/0187091 A1 | 7/2010 | Pierce et al. |
| 2010/0196192 A1 | 8/2010 | Liu et al. |
| 2010/0212221 A1 | 8/2010 | Aradi |
| 2010/0255110 A1 | 10/2010 | Yoon et al. |
| 2010/0272650 A1 | 10/2010 | Tsukada et al. |
| 2010/0272770 A1 | 10/2010 | De et al. |
| 2010/0301013 A1 | 12/2010 | Conneely et al. |
| 2011/0039078 A1 | 2/2011 | Brennan et al. |
| 2011/0052460 A1 | 3/2011 | Coffey et al. |
| 2011/0129536 A1 | 6/2011 | Donati et al. |
| 2011/0155643 A1 | 6/2011 | Tov et al. |
| 2011/0192450 A1 | 8/2011 | Liu et al. |
| 2011/0193025 A1 | 8/2011 | Ichikawa et al. |
| 2011/0196044 A1 | 8/2011 | Hu et al. |
| 2011/0197369 A1 | 8/2011 | Hinestroza et al. |
| 2011/0201527 A1 | 8/2011 | Lin et al. |
| 2011/0206753 A1 | 8/2011 | Karpov et al. |
| 2011/0228890 A1 | 9/2011 | Dean et al. |
| 2011/0244056 A1 | 10/2011 | Santra |
| 2011/0297653 A1 | 12/2011 | Ehrentraut et al. |
| 2012/0070729 A1 | 3/2012 | Wertz et al. |
| 2012/0088066 A1 | 4/2012 | Aytug et al. |
| 2012/0094036 A1 | 4/2012 | Droege et al. |
| 2012/0124899 A1 | 5/2012 | Difrancesco et al. |
| 2012/0136164 A1 | 5/2012 | Ying et al. |
| 2012/0138347 A1 | 6/2012 | Bahnmueller et al. |
| 2012/0138862 A1 | 6/2012 | Hogan |
| 2012/0164073 A1 | 6/2012 | Xu et al. |
| 2012/0174472 A1 | 7/2012 | Mills |
| 2012/0183674 A1 | 7/2012 | Bonn-Savage et al. |
| 2012/0225021 A1 | 9/2012 | Qian et al. |
| 2012/0301528 A1 | 11/2012 | Uhlmann et al. |
| 2012/0301531 A1 | 11/2012 | Uhlmann et al. |

(56) References Cited

U.S. PATENT DOCUMENTS

| | | | |
|---|---|---|---|
| 2012/0313200 A1 | 12/2012 | Jackrel et al. | |
| 2012/0328701 A1 | 12/2012 | Edelson et al. | |
| 2013/0001833 A1 | 1/2013 | Niedermeyer | |
| 2013/0078510 A1 | 3/2013 | Reynolds et al. | |
| 2013/0116369 A1 | 5/2013 | Qi et al. | |
| 2013/0152823 A1 | 6/2013 | Fouda et al. | |
| 2013/0203849 A1 | 8/2013 | Ben Yehuda | |
| 2013/0224477 A1 | 8/2013 | Xu et al. | |
| 2013/0273116 A1 | 10/2013 | Jespersen et al. | |
| 2013/0334104 A1 | 12/2013 | Halas et al. | |
| 2013/0337189 A1* | 12/2013 | Miller | H01G 11/58 |
| | | | 427/256 |
| 2013/0337998 A1 | 12/2013 | Irving et al. | |
| 2014/0024026 A1 | 1/2014 | Alocilja et al. | |
| 2014/0178513 A1 | 6/2014 | Matthews | |
| 2014/0221543 A1 | 8/2014 | Wang et al. | |
| 2014/0274830 A1 | 9/2014 | Pol et al. | |
| 2014/0288194 A1 | 9/2014 | Niedermeyer | |
| 2014/0322351 A1 | 10/2014 | Gawande et al. | |
| 2014/0370293 A1 | 12/2014 | Johnson | |
| 2015/0008313 A1 | 1/2015 | Loboda et al. | |
| 2015/0030919 A1 | 1/2015 | Kozawa et al. | |
| 2015/0066135 A1 | 3/2015 | Weber et al. | |
| 2015/0190550 A1 | 7/2015 | Nusko et al. | |
| 2016/0081346 A1 | 3/2016 | Niedermeyer | |
| 2016/0081347 A1 | 3/2016 | Niedermeyer | |
| 2016/0082513 A1 | 3/2016 | Niedermeyer | |
| 2016/0082514 A1 | 3/2016 | Niedermeyer | |
| 2016/0083146 A1 | 3/2016 | Han | |
| 2016/0083665 A1 | 3/2016 | Niedermeyer | |
| 2016/0083901 A1 | 3/2016 | Niedermeyer | |
| 2016/0144350 A1 | 5/2016 | Aizenberg et al. | |
| 2016/0287631 A1 | 10/2016 | Tarbet et al. | |
| 2016/0298243 A1 | 10/2016 | Tarbet et al. | |
| 2016/0372243 A1 | 12/2016 | Cassignol et al. | |
| 2017/0129975 A1 | 5/2017 | Hallinan et al. | |
| 2017/0136112 A1 | 5/2017 | Pillich et al. | |
| 2017/0166485 A1 | 6/2017 | Hong et al. | |
| 2017/0209490 A1 | 7/2017 | Niedermeyer | |
| 2018/0078580 A1 | 3/2018 | Tarbet et al. | |
| 2018/0126463 A1 | 5/2018 | Niedermeyer | |
| 2018/0282852 A1 | 10/2018 | Soloway | |
| 2019/0225498 A1 | 7/2019 | Ruiz et al. | |
| 2022/0386619 A1 | 12/2022 | Niedermeyer | |

FOREIGN PATENT DOCUMENTS

| | | | |
|---|---|---|---|
| CN | 101180372 A | 5/2008 | |
| CN | 101415644 A | 4/2009 | |
| CN | 101716684 A | 6/2010 | |
| CN | 101932752 A | 12/2010 | |
| CN | 101960070 A | 1/2011 | |
| CN | 102120619 A | 7/2011 | |
| CN | 102753628 A | 10/2012 | |
| CN | 103700898 A | 4/2014 | |
| CN | 103796946 A | 5/2014 | |
| CN | 103891558 A | 7/2014 | |
| CN | 103917546 A | 7/2014 | |
| CN | 104014811 A | 9/2014 | |
| CN | 107107199 A | 8/2017 | |
| CN | 108091834 A | 5/2018 | |
| DE | 102005044360 A1 | 3/2007 | |
| EP | 2140958 A2 | 1/2010 | |
| EP | 2559436 A1 | 2/2013 | |
| EP | 3197622 A1 | 8/2017 | |
| GB | 2442051 A | 3/2008 | |
| GB | 2442051 A * | 3/2008 | H01M 10/08 |
| JP | 11-126634 A | 5/1999 | |
| JP | 2006-351465 A | 12/2006 | |
| JP | 2006351465 A * | 12/2006 | |
| JP | 2007-109618 A | 4/2007 | |
| JP | 2007109618 A * | 4/2007 | |
| JP | 2008-527169 | 7/2008 | |
| JP | 2010-001528 A | 1/2010 | |
| KR | 2006-0021749 A | 3/2006 | |
| WO | WO-2005027255 A1 * | 3/2005 | H01G 11/30 |
| WO | 2005/094501 A2 | 10/2005 | |
| WO | 2006/026026 A2 | 3/2006 | |
| WO | 2006/053225 A2 | 5/2006 | |
| WO | 2006/062826 A2 | 6/2006 | |
| WO | 2006/126823 A1 | 11/2006 | |
| WO | 2008/043396 A1 | 4/2008 | |
| WO | 2008/153239 A1 | 12/2008 | |
| WO | 2009/025955 A1 | 2/2009 | |
| WO | 2009/044146 A1 | 4/2009 | |
| WO | 2009/046081 A2 | 4/2009 | |
| WO | 2009/066011 A2 | 5/2009 | |
| WO | 2009/091900 A1 | 7/2009 | |
| WO | 2011/045627 A1 | 4/2011 | |
| WO | 2012/082364 A1 | 6/2012 | |
| WO | 2013/006430 A2 | 1/2013 | |
| WO | 2013/141879 A1 | 9/2013 | |
| WO | 2014/066850 A2 | 5/2014 | |
| WO | 2014/096556 A2 | 6/2014 | |
| WO | 2014/137352 A1 | 9/2014 | |
| WO | 2014/190097 A1 | 11/2014 | |
| WO | 2016/007112 A1 | 1/2016 | |
| WO | 2016/007113 A1 | 1/2016 | |
| WO | 2016/049132 A1 | 3/2016 | |

OTHER PUBLICATIONS

Kozawa et al., Espacenet machine translation for JP 2007-109618A (Year: 2007).*

U.S. Appl. filed Jan. 25, 2017, Niedermeyer., U.S. Appl. No. 15/415,562.

U.S. Appl. filed Jun. 6, 2014, Neidermeyer., U.S. Appl. No. 14/298,594.

U.S. Appl. filed May 10, 2018, Niedermeyer., U.S. Appl. No. 15/976,447.

U.S. Appl. filed Sep. 22, 2015, Neidermeyer., U.S. Appl. No. 14/861,375.

U.S. Appl. filed Sep. 22, 2015, Neidermeyer., U.S. Appl. No. 14/861,442.

U.S. Application filed Jun. 19, 2018, by Niedermeyer, U.S. Appl. No. 16/012,508.

U.S. Application filed Nov. 27, 2018, by Niedermeyer, U.S. Appl. No. 16/202,078.

Xinxia Yue, et al., "Preparation of silver nanoparticles by tea extracts and its application in the antibacterial finishing of cotton fabric", 2014, Shanghai Textile Science & Technology, vol. 42, No. 5, p. 45-49.

Yuteng Wan et al., "Modification of coral-like SnO2 nanostructures with dense TiO2 nanoparticles fora self-cleaning gas sensor", Taianta, vol. 99, pp. 394-403.

Agnihotri, Shekar, et al., "Immobilized silver nanoparticles enhance contact killing and show highest efficacy elucidation of the mechanism of bacterial action of silver," Nanoscale, 2013. published Jan. 3, 2013. (Year: 2013).

Choudhury et al. "A highly reversible room-temperature lithium metal battery based on crosslinked hairy nanoparticles", Nature Communications, 2015; DOI: 10.1038/ncomms10101.

Cox (https://microbiologysociety.org/blog/rabies-virus-can-we-treat-the-untreatable.html) Jun. 25, 2019, pp. 1-4 (Year 2019).

Examiner Interview Summary received for U.S. Appl. No. 16/202,078, dated Nov. 6, 2020, 3 pages.

Gogoi et al. (Langmuir 2006;22:9322-9328) (Year: 2006).

Gurevitch et al. "Nanocomposites of Titanium Dioxide and Polystyrene-Poly(ethylene oxide) Block Copolymer as Solid- State Electrolytes for Lithium Metal Batteries", Journal of the Electrochemical Society, 2013; 160(9): A1611-A1617.

Hamm et al. "Ionic conductivity enhancement of sputtered gold nanoparticle-in-ionic liquid electrolytes", J Mater Chem A, 2014; 2(3): 792-803.

He et al. "Ionic liquid and nanoparticle hybrid systems: Emerging applications", 2017. Advances in Colloid and Interface Science, 2017; 244: 54-70.

Hopp Bela et al, "Production of nanostructures on bulk metal samples by laser ablation for fabrication of low-reflective surfaces",

(56) References Cited

OTHER PUBLICATIONS applied physics a materials science & processing, Springer Berlin Heidelberg, vol. 113, No. 2, Aug. 14, 2013, pp. 291-296.
Jacobson, R. Inside Energy Oct. 2014; [online] retrieved on Jan. 29, 2017 from: http://www.pbs.org/newshour/updates/six-diseases-actually-worry/; 10 pages.
Korf et al. "Piperidine tethered nanoparticle-hybrid electrolyte for lithium metal batteries", J Mater. Chem., 2014; 2: 11866-11873.
Muller, M. "Bacterial Silver Resistance Gained by Cooperative Interspecies Redox Behavior" Antimicrobial Agents and Chemotherapy 2018, 62 (8), 1-10 (Year: 2018).
Naftulin (https://www.sciencealerl.com/a-deadly-fungus-is-spreading-across-the-worid-and-we-don-t-know-how-to-stop-it) Apr. 9, 2019, pgs (Year: 2019).
Naftulin (https://www.sciencealert.com/a-deadly-fungus-is-spreading-across-the-world-and-we-don-t-know-how-to-stop-it) Apr. 9, 2019, pp. 1-4 (Year: 2019).
Nakashima et al. "Preparation of fusion materials based on ionic liquids and cationic gold nanoparticles", Polymer Journal, 2015; 47:171-176.
Pal et al. (Applied and Environmental Microbiology 2007;73(6):1712-1720) (Year: 2007).
Pan et al. "Hybrid Electrolytes with Controlled Network Structures for Lithium Metal Batteries", Adv. Mater., 2015; 27: 5995-6001.
Samberg et al. (Nanotoxicology 2011 ;5(2):244-253) (Year: 2011).
Santos et al., "Enhancement of antibiotic effect via gold:silver-alloy nanoparticles", J. Nanopart Res (2012) 14:859, pp. 1-8.
Tu et al. "Nanoporous Polymer-Ceramic Composite Electrolytes for Lithium Metal Batteries", Adv. Energy Mater., 2014;4: 1300654.
U.S. Appl. filed Jun. 19, 2018, Niedermeyer., U.S. Appl. No. 16/012,508.
U.S. Appl. filed Jun. 6, 2014, Neidermeyer., U.S. Appl. No. 14/298,593.
U.S. Appl. filed Jun. 6, 2014, Neidermeyer., U.S. Appl. No. 14/298,598.
U.S. Appl. filed Nov. 29, 2017, Tarbet et al., U.S. Appl. No. 15/829,512.
U.S. Appl. filed Nov. 9, 2017, Niedermeyer., U.S. Appl. No. 15/808,088.
U.S. Appl. filed Sep. 22, 2015, Neidermeyer., U.S. Appl. No. 14/861,243.
U.S. Appl. filed Sep. 22, 2015, Neidermeyer., U.S. Appl. No. 14/861,318.
U.S. Appl. filed Sep. 22, 2015, Neidermeyer., U.S. Appl. No. 14/861,500.
U.S. Appl. filed Sep. 22, 2015, Neidermeyer., U.S. Appl. No. 14/861,562.
U.S. Appl. No. 15/098,071, filed Apr. 13, 2016, Tarbet et al.
U.S. Patent Application filed Apr. 1, 2016, by Tarbet et al., U.S. Appl. No. 15/088,863.
U.S. Patent Application filed Jan. 25, 2017, by Niedermeyer, U.S. Appl. No. 15/415,562.
U.S. Patent Application filed Jun. 6, 2014, by Neidermeyer, U.S. Appl. No. 14/298,594.
U.S. Patent Application filed Sep. 22, 2015, by Neidermeyer, U.S. Appl. No. 14/861,375.
U.S. Patent Application filed Sep. 22, 2015, by Neidermeyer, U.S. Appl. No. 14/861,442.
"International Coral Reef Initiative,""What are Corals"", downloaded from http://www.iciforum.org/about-on Sep. 5, 2017."
Badawy et al., "Surface Charge-Dependent Toxicity of Silver Nanoparticles", Environ. Sci. Technol. 2011, 45, 283-287.
Barcikowski et al., "Generation of nanoparticle colloids by picosecond and femtosecond laser ablations in liquid flow", Appl. Phys. Lett. 91, 083113 (2007).
Chien et al., "Synthesis of nanoparticles: sunlight formation of gold nanodecahedra for ultra-sensitive lead-ion detection", Green Chem., vol. 13, pp. 1162-1166, May 2011.
Daissy Paredes, et al., "Synthesis, characterization, and evaluation of antibacterial effect of Ag nanoparticles against Escherichia coli 0157:h7 and methicillin-resistant Staphylococcus aureus (Mrsa)", Apr. 3, 2014, International Journal of Nanomedicine, p. 1717-1729.
Guangnian Xu, et al."Progress in preparation of nano-silver", 2019, Materials Review, vol. 24, No. 11, p. 139-142.
Gui, M. et al. "Cryo-electron microscopy structures of the SARS-CoV spike glycoprotein reveal a prerequisite conformational state for receptor binding" Cell Research (2017) 27:119-129 (Year: 2017).
Hopp Bela et al, "Production of nanostructures on bulk metal samples by laser ablation for fabrication of low-reflective surfaces", applied physics a materials science & processing, Springer Berlin Heidelberg.
Hultin, "A Guide to Solvents and Reagents in Introductory Organic Chemistry for students in 2.222", Obtained from https://home.cc.umanitoba.ca/-hultin/chem2220/Support/solvents_and_reagen- ts.pdf on Jan. 25, 2018, originally published Feb. 12, 2002—17 pages.
International Coral Reef Initiative, "What are Corals", downloaded from http://www.iciforum.org/about-coral-reefs/what-are-corals on Sep. 5, 2017.
International Search Report for PCT Aoo. No. PCT/US2015/051639 dated Dec. 17, 2015.
International Search Report for PCT Aoo. No. PCT/US2015/051640 dated Dec. 17, 2015.
International Search Report for PCT Aoo. No. PCT/US2015/051643 dated Dec. 17, 2015.
International Search Report for PCT Aoo. No. PCT/US2015/051649 dated Dec. 17, 2015.
International Search Report for PCT App. No. PCT/US2012/044907 dated Jan. 13, 2013.
International Search Report for PCT App. No. PCT/US2015/051638 dated Jan. 29, 2016.
International Search Report for PCT App. No. PCT/US2015/051640 dated Dec. 17, 2015.
International Search Report for PCT App. No. PCT/US2015/051642 dated Dec. 14, 2015.
International Search Report for PCT App. No. PCT/US2015/051643 dated Dec. 17, 2015.
International Search Report for PCT App. No. PCT/US2015/051646 dated Dec. 18, 2015.
International Search Report for PCT App. No. PCT/US2015/051649 dated Dec. 17, 2015.
Jacobson, "These six diseases should worry you more than Ebola", Inside Energy Oct. 2014; [online] retrieved on Jan. 29, 2017 from http://www.pbs.org/newshour/updates/six-diseases-actually-worry/; 10 pages.
Jana et al., "Seeding Growth for Size Control of 5-40 nm Diameter Gold Nanoparticles", Langmuir 2001, 17, 6782-6786.
Kewal K. Jain MD, FRACS, FFPM., "The Handbook of Nanomedicine" Humana Press, 2008.
Leisure Pro, "Coral Identification: Types of Coral (Part 1-Hard Coral)", downloaded from http://www.leisurepro.com/blog/explorethe- blue/coral-identification-types-of-coral-part-1 on Sep. 2017.
Liu et al., "A novel coral-like porous Sn02 hollow architecture: biomimetic swalloing growth mechanism and enhanced photovoltaic property for dye-sensitized solar cell application", Chem Commun., vol. 46, pp. 472-474,2010.
Lu et al. "Ionic-Liquid-Nanoparticle Hybrid Electrolytes: Applications in Lithium Metal Batteries", Angew. Chem. Int. Ed., 2014; 53: 488-492.
Mafune et al., "Formation of Stable Platinum Nanoparticles by Laser Ablation in Water", J. Phys. Chem. B 2003, 107, 4218-4223.
Malvern, "The use of the Malvern Zetasizer for the measurement of Zeta Potential", article from the Internet, http://www.malvern.co.alLaboratory/zetaintm.htm> 10 pages, printed on Feb. 12, 2002.
Malvern, "Zeta Potential Theory, Dispersion stability", article from the Internet, http://www.malvern.co.uk/Laboratory/zettheo.htm >, 3 pages, printed on Feb. 12, 2002.
Mycozil, "The Benefits of Colloidal Silver for Toenail Fungus", http://wwwnailfungustoenail.com/benefitsofcol-loidalsilverfortoenailfungu- s.html.
Naftulin (https://www.sciencealert.com/a-deadly-fungus-is-spreading-across-the-worid-and-we-don-t-know-how-to-stop-it) Apr. 9, 2019, pgs (Year: 2019).

(56) References Cited

OTHER PUBLICATIONS

NOAA Ocean Service Education, "Corals", downloaded from https://oceanservice.noaa.gov/education/kits/corals/coral03_growth.html on Sep. 5, 2017.

Pal et al., "Does the Antibacterial Activity of Silver Nanoparticles Depend on the Shape of the Nanoparticle?", Applied and Environmental Microbiology, 2007; 73(6): 1712-1720.

Phuoc et al, "Synthesis of Ag-deoionized water nanofluids using multi-beam laser ablation in fluids", Optics and Lasers in Engineering 45 (2007) 1099-1106.

Prabhu et al., "Silver nanoparticles: mechanism of antimicrobial action, synthesis, medical applications, and toxicity effects", International Nano Letters, 2012, 2:32, pp. 1-10.

Rawashdeh et al., "Antibacterial Mechanisms of Metallic Nanoparticles: a Review", Dynamic Biochemistry, Process Biotechnology and Molecular Biology 2009 pp. 12-20.

Rhim, J-W. et al. "Preparation and characterization of bio-nanocomposite films of agarand silver nanoparticles: Laser ablation method" Carbohydrate Polymers 103 (2014) 456 456^65 65 (Year: 2014).

Riabinina et al., "Influence of pressure on the Pt nanoparticle growth modes during pulsed laser ablation", Journal of Applied Physics 108, 034322 (2010, published online Aug. 12, 2010).

Sahu et al., "Flower Shaped Silver Nanostructures: an Efficient Bacteria Exterminator", A Search for Antibacterial Agents; Chapter 2; [online] retrieved from: http://www.intechopen.com/books/a-search-forantibacterial-agents; 2007; 73(6): 1712-1720 (Year: 2007).

Sweeney et al., "Rapid Purification and Size Separation of Gold Nanoparticles via Diafiltration", J. Am. Chem. Soc. 2006, 128, 3190-3197 (Published on web Feb. 18, 2006).

Sylvestre et al., "Surface Chemistry of Gold Nanoparticles Produced by Laser Ablation in Aqueous Media", J Phys. Chem. B 2004, 108, 16864-16869.

Thanaa Majied Al-Nori, "Antibacterial activity of Silver and Gold Nanoparticles against *Streptococus, Staphylococcus aureus* and *E.coli*", Al- Mustansiriya J. Sci, Vo. 23, No. 3, 2012.

Theodorou et al., "Inhalation of Silver Nanomaterials—Seeing the Risks", International Journal of Molecular Sciences, 2014, 15, 23936-23974.

U.S. Appl. filed Apr. 1, 2016, Tarbet et al., U.S. Appl. No. 15/088,863.

U.S. Appl. filed Apr. 13, 2016, Tarrbet et al., U.S. Appl. No. 15/098,071.

Correard et al.,"Gold nanoparticles prepared by laser ablation in aqueous biocompatible solutions: assessment of safety and biological identity for nanomedicine applications", International Journal of Nanomedicine, Nov. 21, 2014; pp. 5415-5430.

International Search Report and Written Opinion received for PCT Patent Application No. PCT/US22/71448, dated Jun. 7, 2022, 9 pages.

\* cited by examiner

Pb + H$_2$SO$_4$

Pb + H₂SO₄ + Attostat Au

Pb + Au + H₂SO₄ + Attostat Au

NANOPARTICLE COMPOSITIONS AND METHODS FOR ENHANCING LEAD-ACID BATTERIES

CROSS-REFERENCE TO RELATED APPLICATIONS

This application is a continuation-in-part of U.S. patent application Ser. No. 16/202,078, filed Nov. 27, 2018, which claims the benefit of U.S. Prov. App. No. 62/591,540, filed Nov. 28, 2017, and U.S. Prov. App. No. 62/674,416, filed May 21, 2018, which are incorporated by reference in their entirety.

BACKGROUND

Lead-acid batteries are the most common type of rechargeable battery in the field of motor vehicle batteries. Although lead-acid batteries have low energy densities compared to newer battery technologies, their ability to provide relatively large surge currents make them effective for powering automobile starter motors. Lead-acid batteries are also relatively inexpensive compared to newer battery technologies, making them attractive choices for providing rechargeable power even in circumstances outside the motor vehicle field.

A lead-acid battery in a charged state includes a "negative electrode" made of ground state lead (Pb), a "positive electrode" made of lead dioxide ($PbO_2$), and an electrolyte containing aqueous sulfuric acid ($H_2SO_4$). During discharge, lead from the negative electrode is oxidized by bisulfate ions from the sulfuric acid to form lead ions ($Pb^{2+}$), each corresponding to a sulfate ion from the sulfuric acid to form partially soluble lead sulfate ($PbSO_4$), with the reaction producing 2 electrons ($e^-$). In the other half redox reaction, lead dioxide ($Pb^{4+}$) from the positive electrode is reduced by protons ($H^+$) from the sulfuric acid to form lead ions ($Pb^{2+}$), each corresponding to a sulfate ion from the sulfuric acid to form partially soluble lead sulfate. Water is also produced, forming a more dilute sulfuric acid electrolyte in a discharged state. Over time and/or when the battery is more fully discharged, solid lead sulfate can form and precipitate onto the electrode plates.

When a newer battery is recharged, solid lead sulfate formed on the positive electrode plates during discharge can easily revert back to ground state lead ($Pb^{2+}$ is reduced to Pb at the positive electrode plates), solid lead sulfate formed on the negative electrode plates during discharge can easily revert back to lead oxide ($Pb^{2+}$ is oxidized to $Pb^{4+}$ at the negative electrode plates), and sulfuric acid is produced from protons ($H^+$) and released sulfate ions ($SO_4^{2-}$) to form the electrolyte. However, lead-acid batteries will, over time, lose the ability to be recharged as a result of excessive sulfation at and/or degradation of the electrode plates. Through multiple cycles of charge and discharge, some of the lead sulfate on the electrode plates will begin to form a more stable, crystalline form covering the plates. Over time, progressive buildup of solid lead sulfate on the plates increases internal resistance of the battery cell, and less and less of the surface area of the plates is available for supplying current and accepting a charge. Eventually, so much of the battery capacity is reduced that the battery is considered "dead" and must be replaced.

BRIEF SUMMARY

In some embodiments, a method of rejuvenating and/or improving the performance of a lead-acid battery and/or enhancing the performance of a new battery includes: (1) providing a lead-acid battery; (2) adding an amount of nonionic, ground state metal nanoparticles to the electrolyte solution of the battery to yield a concentration of nanoparticles in the electrolyte of least about 100 ppb and up to about 100 ppm, 50 ppm, 25 ppm, 10 ppm, 5 ppm, or 2 ppm; and (3) the nonionic, ground state metal nanoparticles rejuvenating and/or improving the performance of the lead-acid battery.

In the case of dead battery, or a fully or partially discharged battery, the method may also include recharging the battery to regenerate lead (Pb) at the "positive" electrode plate ("anode" during discharge, "cathode" during recharge), lead dioxide ($PbO_2$) at the "negative" electrode plate ("cathode" during discharge, "anode" during recharge), and sufficient sulfuric acid in the electrolyte solution. It is believed that by including nanoparticles in the electrolyte, resistance through the lead sulfate deposited on the electrode plates is decreased. This facilitates an increased number of charge-discharge cycles, thereby increasing total service life of the battery.

In some embodiments, the metal nanoparticles are added so as to bring the concentration of nanoparticles within the electrolyte to a concentration of about 100 ppb to about 2 ppm. The treated battery may show one or more of increased fully charged resting voltage, increased partially discharged voltage, increased cranking amps, increased cold cranking amps, and increased reserve capacity. Nanoparticle concentration levels above 2 ppm (e.g., up to about 100 ppm, 50 ppm, 25 ppm, 10 ppm, or 5 ppm) may also be utilized where appropriate, although effective performance enhancement was typically found when using concentration levels within the foregoing ranges without the need to incur additional material costs at higher concentration levels.

It has also been found that the disclosed metal nanoparticles added to or included with the electrolyte end up migrating to the paste on the battery electrodes. Battery electrode paste is typically applied to the electrodes during manufacture or remanufacture of batteries and is made by mixing lead (II) oxide (PbO) with sulfuric acid and water to form lead sulfate compounds, such as $PbO.PbSO_4$ (monobasic lead sulfate), $2PbO.PbSO_4$ (dibasic lead sulfate), $3PbO.PbSO_4$ (tribasic lead sulfate), and $4PbO.PbSO_4$ (tetrabasic lead sulfate). In some cases, a binder, such as a polymer binder, can be added to the paste. It will be readily appreciated that since nanoparticles added to the electrolyte will migrate to the paste on the electrodes, it can be advantageous during manufacture or remanufacture of batteries to add the disclosed nanoparticles directly to the battery electrode paste in addition to or as an alternative to adding the nanoparticles to the electrolyte.

Some embodiments are directed to a lead-acid battery having effective resistance to degradation from the buildup of crystalline $PbSO_4$ on electrode surfaces. The battery includes a "positive electrode" (cathode during discharge, anode during recharge), a "negative electrode" (anode during discharge, cathode during recharge), and an electrolyte. A plurality of nonionic, ground-state metal nanoparticles are also included and are dispersed within the electrolyte at a concentration of at least about 100 ppb (e.g., up to about 2 ppm, 5 ppm, 10 ppm, 25 ppm, 50 ppm, or 100 ppm).

In preferred method or device embodiments, the metal nanoparticles include gold nanoparticles. Some embodiments may additionally or alternatively include metal nanoparticles formed as alloys of any combination of gold, silver, platinum, and first row transition metals. The metal nanoparticles may be spherical and/or coral-shaped nanoparticles. In the case of coral-shaped nanoparticles, the particles have a non-uniform cross section, a smooth surface, and a globular structure formed by multiple, non-linear strands joined together without right angles, with no edges or corners resulting from joining of separate planes.

To enable the nanoparticles to effectively position themselves within the battery plate, the particles preferably have a mean length or diameter of less than about 100 nm. This size allows the nanoparticles to move to positions sufficiently deep within the layer of $PbSO_4$ buildup at an electrode plate to provide their beneficial electropotential-modulating effects. The particles, for example, may have a mean length or diameter ranging from about 25 nm to about 80 nm.

The smooth, non-angular shape of the nanoparticles described herein also allow for this beneficial positioning at plate grain boundaries sufficiently deep within the layer of $PbSO_4$ buildup. In contrast, the angular, hedron-like shapes of conventional nanoparticles, including those formed using a chemical synthesis process, prevent this desired positioning because these nanoparticles tend to get caught at superficial depths of the crystalline $PbSO_4$ buildup layer.

Nanoparticles may be formed through a laser-ablation process, in contrast to a chemical synthesis process, to produce nanoparticles that have a smooth surface with no external bond angles or edges, as opposed to a hedron-like or crystalline shape nanoparticles made by conventional chemical processes. In some embodiments, the nanoparticles have a narrow size distribution wherein at least about 99% of the nanoparticles are within 30%, 20%, or 10% of the mean length or diameter.

Additional features and advantages will be set forth in part in the description that follows, and in part will be obvious from the description, or may be learned by practice of the embodiments disclosed herein. It is to be understood that both the foregoing brief summary and the following detailed description are exemplary and explanatory only and are not restrictive of the embodiments disclosed herein or as claimed.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings, in which.

DETAILED DESCRIPTION

Introduction

Figure 1:
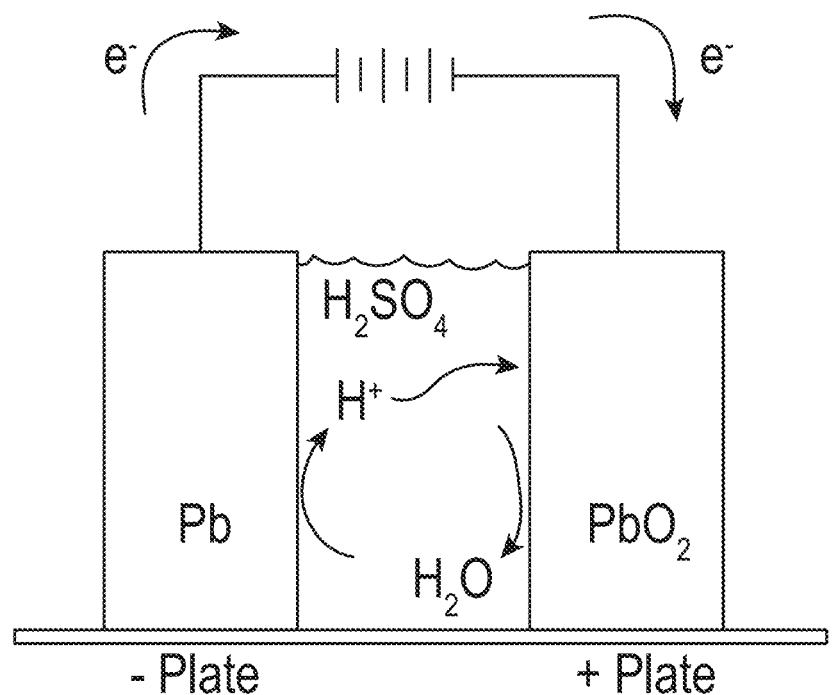
FIGS. 1 and 2 illustrate a lead-acid battery cell in a charged/discharging and discharged state, respectively.

Disclosed herein are nanoparticle compositions and related methods for improving the performance of lead-acid batteries. In particular, embodiments described herein may be utilized to provide increased voltage (which corresponds to increased current and power) and/or extended battery life. In at least some embodiments, a battery considered to be "dead" may be revived by adding an effective amount of the nanoparticles described herein to the electrolyte of the battery, optionally in combination with a recharge cycle.

As used herein, a "dead" battery may be a battery that is unable to receive and/or hold a charge for a sufficiently long time and/or provide sufficient amperage for its intended purpose. As used herein, "rejuvenating" a dead battery means bringing it from a dead state to a state where the battery is able to receive and/or hold a charge for a sufficiently long time and provide sufficient amperage for its intended purpose. More particular means for determining battery state are described in more detail below.

Battery condition may be checked using a suitable testing method as known in the art, such as checking the fully charged resting voltage of the battery, subjecting the battery to a load test, or determining the specific gravity (e.g., using a hydrometer) of the electrolyte, which decreases as the battery is discharged and/or is lower than optimal in a dead or "dying" battery even when "fully charged." For purposes of this disclosure, such batteries may still be in a working condition, but may have deteriorated to less than the recommended or desired capacity and/or voltage. For example, for a typical six-cell motor vehicle lead-acid battery, a fully charged resting voltage of less than 12.6 V (i.e., about 2.1 V per cell) may indicate that the battery is in need of replacement or repair even if still capable of starting the motor vehicle. A fully charged resting voltage of about 12 V or less is an even greater indication that the battery is in need of replacement.

A load test may be an even better means of determining the state of the battery, as the load test will determine the actual deliverable amperage of the battery. Suitable load tests include measuring the cranking amps (CS) and/or cold cranking amps (CCA) of the battery. These tests measure the discharge load in amperes that a fully charged battery can deliver for 30 seconds while maintaining terminal voltage equal or greater than 1.20 V per cell. The test is performed at 0° F./−18° C. (for CCA) or 32° F./0° C. (for regular CA). For purposes of this disclosure, a battery may be considered to be "dead" when the CA and/or CCA of the battery falls to or below about 85%, 80%, 75%, 70%, 65%, or 50% of the battery's initial rating (e.g., listed manufacturer rating or initial new battery rating).

The reserve capacity of the battery may be used as an additional or alternative indicator of battery status. A reserve capacity test measures the duration the battery can maintain a constant 25 amperes discharge, at 80° F. (27° C.) before being discharged down to 10.5 V. For purposes of this disclosure, a battery may be considered to be "dead" when the reserve capacity of the battery falls to or below about 85%, 80%, 75%, 70%, 65%, or 50% of the battery's initial rating (e.g., listed manufacturer rating or initial new battery rating).

It has now been found that adding an amount of nonionic, ground state metal nanoparticles to the electrolyte of a lead-acid battery may improve the performance of the lead-acid battery and/or may bring the battery from a depleted or "dead" sate to a usable state. Surprisingly, it has been found that these effects may be achieved using relatively low concentrations of nanoparticles in the electrolyte, on the order of about 100 ppb to about 2 ppm (or up to about 5 ppm, 10 ppm, 25 ppm, 50 ppm, or 100 ppm).

Little to no difference was seen in the effects from a 200 ppb concentration to a 2 ppm concentration, indicating that beneficial effects may be achieved even at the lower end of these ranges. For example, as compared to a level of 2 ppm, substantially similar effects may be achieved at a level of about 200 ppb to 1 ppm, or about 200 ppb to 750 ppb, or about 200 ppb to 500 ppb. Using less nanoparticle material can significantly reduce costs. Nonetheless, amounts of the disclosed nanoparticles up to about 5 ppm, 10 ppm, 25 ppm, 50 ppm, or 100 ppm are substantially less than typical amounts of other nanoparticles used in prior art systems. For example, conventional nanoparticle battery treatments may add metal nanoparticles to the electrolyte at concentrations on the order of 0.5% or more by weight (i.e., 5000 ppm). Even if effective in improving battery performance, such high levels of nanoparticles represent a significant cost and may negatively impact the electrolyte.

Overview of Lead-Acid Battery Rejuvenation or Enhancement

FIG. 1 illustrates a typical lead-acid battery cell in a charged/actively discharging state. At the negative electrode plate, the electrode consists essentially of ground state lead (Pb) and/or includes a lead coating, while at the positive electrode plate, the electrode consists essentially of lead dioxide ($PbO_2$) and/or includes a $PbO_2$ coating. An electrolyte, typically of aqueous sulfuric acid ($H_2SO_4$), is in contact with the positive and negative electrode plates. Lead-acid batteries including other electrolytes, such as citric acid, are also included within the scope of the present disclosure.

In a typical sulfuric acid electrolyte, the sulfuric acid provides hydrogen ions and soluble bisulfate ions, which are both consumed by redox reactions during discharge and, alternatively, are produced by redox reactions during recharge. When the circuit is closed, the oxidation reaction at the negative plate generates electrons and hydrogen ions, and the lead electrode begins to convert to $PbSO_4$. The reaction at the negative plate is shown below:

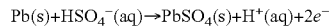

At the positive plate, the electrons and hydrogen ions combine with oxygen from the $PbO_2$ to form water, while the $PbO_2$ electrode begins to convert to $PbSO_4$. The reaction at the positive plate is shown below:

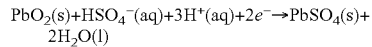

Because more protons are consumed than are produced during discharge, the electrolyte becomes less acidic, and thus more dilute, as water is generated at the positive plate and the cell moves toward the discharged state.

Figure 2:
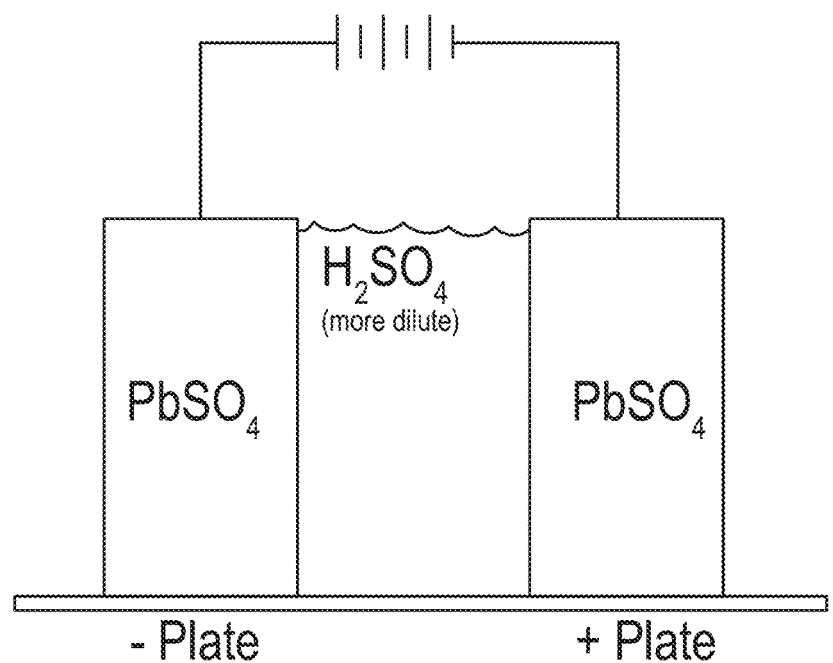

FIG. 2 illustrates the battery cell in the discharged state. As shown, both electrodes will move contain a greater proportion of $PbSO_4$. Recharging the battery involves applying sufficient voltage to the electrolyte and run the circuit in the reverse of that shown in FIG. 1, thereby bringing the negative plate toward a greater proportion of lead (Pb), the positive plate toward a greater proportion of $PbO_2$, and causing the electrolyte to become more concentrated with sulfuric acid.

Figure 3:
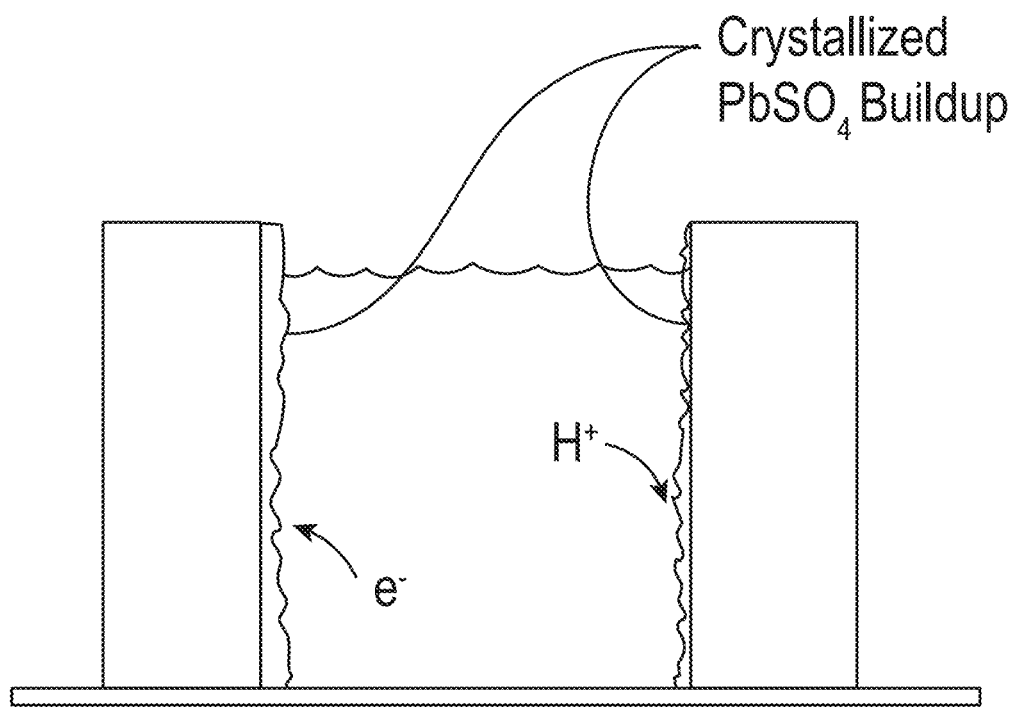
FIG. 3 illustrates a lead-acid battery cell showing buildup of crystallized pre-precipitated $PbSO_4$ on electrode surfaces, which can at least partially block electrons or ions from passing to or from the electrodes.

FIG. 3 schematically illustrates buildup of a crystalline $PbSO_4$ on the electrode plates. In a newer battery, solid $PbSO_4$ formed on the electrode plates is more amorphous and more easily reverts back to lead, lead dioxide, and sulfuric acid as a voltage is applied and the battery is recharged. Through multiple cycles of charge and discharge, however, some of the $PbSO_4$ will not be recombined into the electrolyte and will begin to form a more stable, crystalline form on the plates. Over time, sulfation buildup reduces the ability of electrons and ions to pass to and from the working electrode surfaces, increasing internal resistance of the battery cell and decreasing its capacity. In addition, the buildup of this stable crystalline form of $PbSO_4$ can eventually cause the plate to bend, making the battery take on the bulging shape associated with dead batteries.

Figure 4:
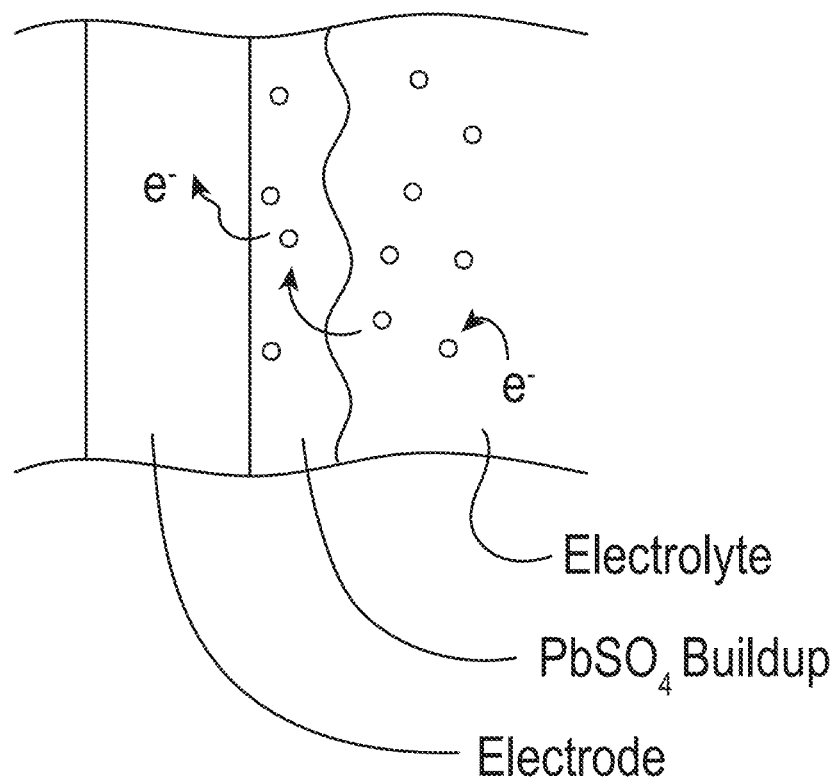
FIG. 4 illustrates a lead-acid battery cell having an amount of non-ionic, ground state, metal nanoparticles dispersed within the electrolyte for improving electron transport across the layer of crystallized $PbSO_4$ buildup at the anode during a recharge cycle.

FIG. 4 schematically illustrates a plurality of nonionic, ground state metal nanoparticles added to the electrolyte of the battery cell. Without wishing to be bound to any particular theory, it is postulated that a portion of the nanoparticles are able to move into the layer of crystalline $PbSO_4$ buildup and maintain open regions of the electrode plate where the buildup of crystalline $PbSO_4$ is prevented. The nanoparticles within the bulk electrolyte and within the layer of crystalline $PbSO_4$ buildup are able to improve electron transport through or across the layer of the crystalline $PbSO_4$ buildup and to the working surface of the electrode plate.

Likewise, it is theorized that during recharging, the nanoparticles potentiate the release of $SO_4^{2-}$ ions from solid $PbSO_4$ to reform $H_2SO_4$ in the electrolyte. It is believed that the nanoparticles are able to bring about the dissolution of even stable, crystalline forms of $PbSO_4$ responsible for detrimental buildup and battery degradation. Thus, it is theorized that the nanoparticles can both: (1) aid in electron transport through or across a crystalline $PbSO_4$ layer, and (2) aid in slowing or preventing the formation, or promoting the disassociation, of crystalline $PbSO_4$ deposits over time.

It has also been found that the disclosed metal nanoparticles added to or included with the electrolyte end up migrating to the paste on the battery electrodes. Battery electrode paste is typically applied to the electrodes during manufacture or remanufacture of batteries and is made by mixing lead (II) oxide (PbO) with sulfuric acid and water to form lead sulfate compounds, such as PbO.PbSO$_4$ (monobasic lead sulfate), 2PbO.PbSO$_4$ (dibasic lead sulfate), 3PbO.PbSO$_4$ (tribasic lead sulfate), and 4PbO.PbSO$_4$ (tetrabasic lead sulfate). In some cases, a binder, such as a polymer binder, can be added to the paste. It will be readily appreciated that since nanoparticles added to the electrolyte will migrate to the paste on the electrodes, it can be advantageous during manufacture or remanufacture of batteries to add the disclosed nanoparticles directly to the battery electrode paste in addition to or as an alternative to adding the nanoparticles to the electrolyte.

Batteries that were manufactured with or treated with the nanoparticles described herein were also surprisingly and unexpectedly found to charge at much faster rates compared to untreated batteries. In one example, a battery that was expected to take about 14 hours to fully charge was able to reach a fully charged state after about 6 hours after nanoparticles were included within the electrolyte. Treated batteries may therefore reduce the charging time by 10% or more, by 20% or more, by 30% or more, by 40% or more, by 50% or more, or up to about 60%.

Preferred embodiments utilize coral-shaped metal nanoparticles, which are described in more detail below. As used herein, the term "coral-shaped nanoparticles" refers to nanoparticles that have a non-uniform cross section, a smooth surface, and a globular structure formed by multiple, non-linear strands joined together without right angle and with no edges or corners resulting from joining of separate planes. This is in contrast to nanoparticles made through a conventional chemical synthesis method, which yields particles having a hedron-like shape with crystalline faces and edges, and which can agglomerate to form "flower-shaped" particles.

Other embodiments may additionally or alternatively include spherical-shaped nanoparticles. As used herein, the spherical-shaped nanoparticles are not the same as the hedron-like, multi-edged particles formed through a conventional chemical synthesis method. Rather, spherical-shaped nanoparticles are formed through a laser-ablation process that results in a smooth surface without edges.

The relative smoothness of the surfaces of the nanoparticles described herein beneficially enables the formation of very stable nanoparticle solutions, even without the use of a stabilizing agent. For example, such smooth nanoparticles may be stored in solution (e.g., at room temperature) for months or even years (e.g., 1 to 2 years, up to 3 years or more, up to 5 years or more) with little to no agglomeration or degradation in particle size distribution.

The smooth, non-angular shape of the nanoparticles described herein also allow for beneficial positioning of the nanoparticles at plate grain boundaries that are sufficiently deep within the layer of PbSO$_4$ buildup. In contrast, the angular, hedron-like shapes of conventional nanoparticles, including those formed using a chemical synthesis process, prevent this desired positioning because these nanoparticles tend to get caught at superficial depths of the crystalline PbSO$_4$ buildup layer.

Preferred embodiments utilize gold nanoparticles, though other materials may additionally or alternatively be utilized as well. For example, some embodiments may additionally or alternatively include nanoparticles formed from alloys of gold, silver, platinum, first row transition metals, or combinations thereof. Other exemplary metals are described below.

The carrier for the nanoparticles is preferably suitable for addition into the electrolyte of a lead-acid battery. In preferred embodiments, the carrier is water and/or aqueous sulfuric acid without any additional stabilizing agents so as not to disrupt the reactivity of the electrolyte.

The nanoparticle compositions may be added to a lead-acid battery having a liquid or solid (e.g., gel) electrolyte. Nanoparticle compositions described herein may be added to dead or underperforming batteries to rejuvenate and/or improve the performance of the batteries. Nanoparticle compositions described herein may also be added to new or properly functioning batteries to enhance capacity and/or prophylactically extend the usable life of the battery.

The addition of nanoparticles to the electrolyte of a lead-acid battery may improve one or more of fully charged resting voltage, partially discharged voltage, cranking amps, cold cranking amps, reserve capacity, and/or other battery capacity and/or power measures. In one example, average cell voltage of a motor vehicle lead-acid battery was shown to increase from about 2.1 V or about 2.4 V to about 2.6 V (e.g., an increase of about 8 to 25%) after addition of the disclosed nanoparticles to the electrolyte.

Nanoparticle Configurations

In some embodiments, the metal nanoparticles may comprise or consist essentially of nonionic, ground state metal nanoparticles. Examples include coral-shaped metal nanoparticles, spherical-shaped metal nanoparticles, or a blend of spherical-shaped metal nanoparticles and coral-shaped metal nanoparticles.

Figure 5A:
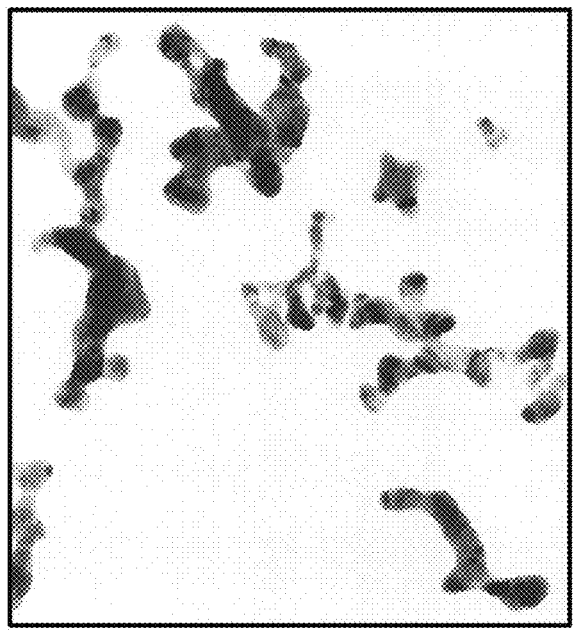
FIGS. 5A-5C show transmission electron microscope (TEM) images of coral-shaped nanoparticles useful for improving the performance of a lead-acid battery.
Figure 5B:
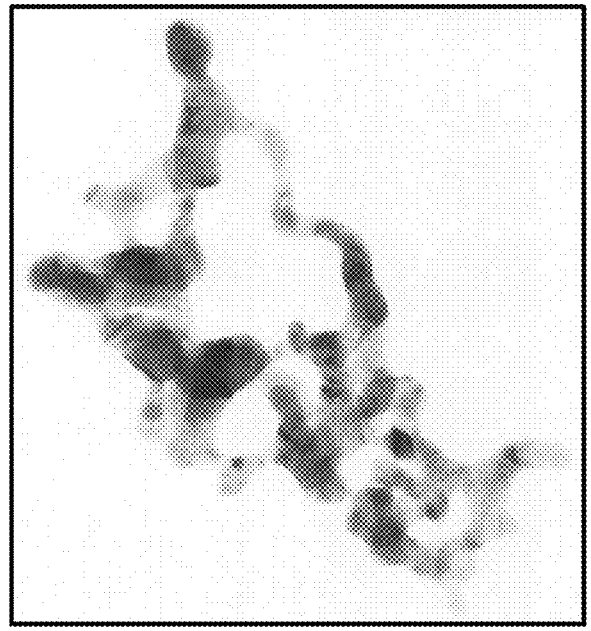
Figure 5C:
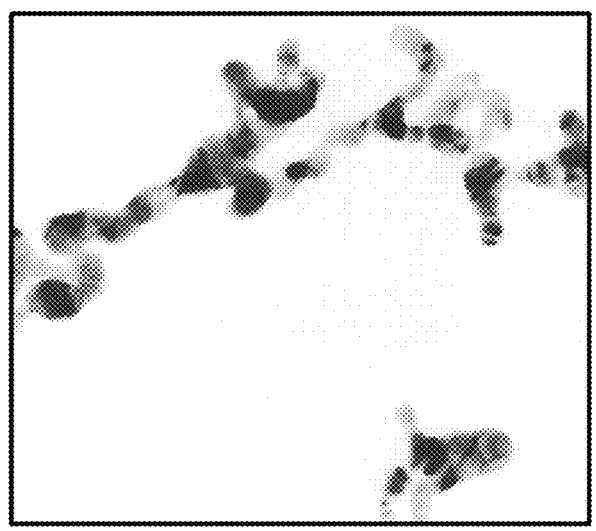

In some embodiments, nonionic metal nanoparticles useful for making nanoparticle compositions comprise coral-shaped nanoparticles (see FIGS. 5A-5C). The term "coral-shaped metal nanoparticles" refers to nanoparticles that are made from one or more metals, preferably nonionic, ground state metals having a non-uniform cross section and a globular structure formed by multiple, non-linear strands joined together without right angles. Similar to spherical-shaped nanoparticles, coral-shaped nanoparticles may have only internal bond angles and no external edges or bond angles. In this way, coral-shaped nanoparticles can be highly resistant to ionization, highly stable, and highly resistance to agglomeration. Such coral-shaped nanoparticles can exhibit a high ξ-potential, which permits the coral-shaped nanoparticles to remain dispersed within a polar solvent without a surfactant, which is a surprising and unexpected result.

In some embodiments, coral-shaped nanoparticles can have lengths ranging from about 15 nm to about 100 nm, or about 20 nm to about 90 nm, or about 25 nm to about 80 nm, or about 30 nm to about 75 nm, or about 40 nm to about 70 nm. In some embodiments, coral-shaped nanoparticles can have a particle size distribution such that at least 99% of the nanoparticles have a length within 30% of the mean length, or within 20% of the mean length, or within 10% of the mean length. In some embodiments, coral-shaped nanoparticles can have a ξ-potential of at least 10 mV, preferably at least about 15 mV, more preferably at least about 20 mV, even more preferably at least about 25 mV, and most preferably at least about 30 mV.

Examples of methods and systems for manufacturing coral-shaped nanoparticles through a laser-ablation process are disclosed in U.S. Pat. No. 9,919,363, which is incorporated herein by reference.

Figure 6A:
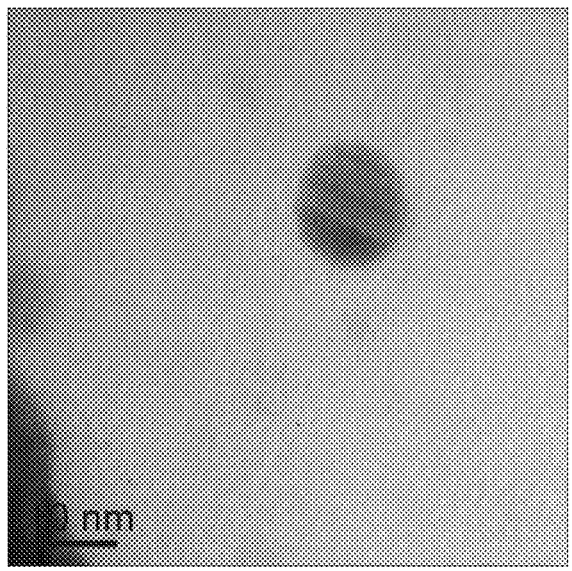
FIGS. 6A-6C show TEM images of exemplary spherical-shaped metal nanoparticles (i.e., that have no surface edges or external bond angles) useful for improving the performance of a lead-acid battery, the nanoparticles showing substantially uniform size and narrow particle size distribution, smooth surface morphology, and solid metal cores.
Figure 6B:
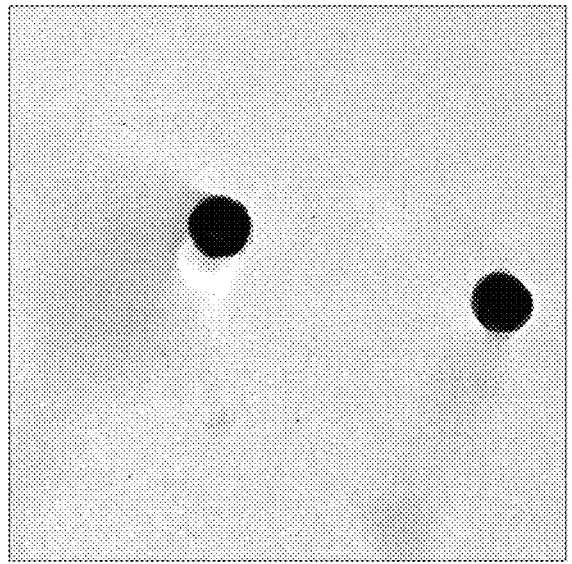
Figure 6C:
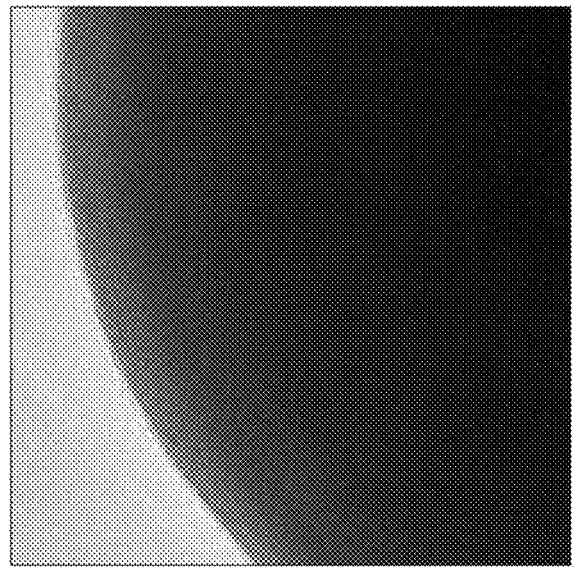

In some embodiments, metal nanoparticles useful for making nanoparticle compositions may also comprise spherical nanoparticles instead of, or in addition to, coral-shaped nanoparticles. FIGS. 6A-6C show transmission electron microscope (TEM) images of spherical-shaped nanoparticles utilized in embodiments of the present disclosure. FIG. 6A shows a gold/silver alloy nanoparticle (90% silver and 10% gold by molarity). FIG. 6B shows two spherical nanoparticles side by side to visually illustrate size similarity. FIG. 6C shows a surface of a metal nanoparticle showing the smooth and edgeless surface morphology.

Spherical-shaped metal nanoparticles preferably have solid cores. The term "spherical-shaped metal nanoparticles" refers to nanoparticles that are made from one or more metals, preferably nonionic, ground state metals, having only internal bond angles and no external edges or bond angles. In this way, the spherical nanoparticles are highly resistant to ionization, highly stable, and highly resistance to agglomeration. Such nanoparticles can exhibit a high $\xi$-potential, which permits the spherical nanoparticles to remain dispersed within a polar solvent without a surfactant, which is a surprising and unexpected result.

In some embodiments, spherical-shaped metal nanoparticles can have a diameter of about 40 nm or less, about 35 nm or less, about 30 nm or less, about 25 nm or less, about 20 nm or less, about 15 nm or less, about 10 nm or less, about 7.5 nm or less, or about 5 nm or less. Spherical-shaped nanoparticles can have a mean diameter of about 3 nm to about 20 nm, or about 4 nm to about 15 nm.

In some embodiments, spherical-shaped nanoparticles can have a particle size distribution such that at least 99% of the nanoparticles have a diameter within 30% of the mean diameter of the nanoparticles, or within 20% of the mean diameter, or within 10% of the mean diameter. In some embodiments, spherical-shaped nanoparticles can have a mean particle size and at least 99% of the nanoparticles have a particle size that is within ±3 nm of the mean diameter, ±2 nm of the mean diameter, or ±1 nm of the mean diameter. In some embodiments, spherical-shaped nanoparticles can have a $\xi$-potential (measured as an absolute value) of at least 10 mV, preferably at least about 15 mV, more preferably at least about 20 mV, even more preferably at least about 25 mV, and most preferably at least about 30 mV.

Examples of methods and systems for manufacturing spherical-shaped nanoparticles through a laser-ablation process are disclosed in U.S. Pat. No. 9,849,512, incorporated herein by this reference.

The metal nanoparticles, including coral-shaped and/or spherical-shaped nanoparticles, may comprise any desired metal, mixture of metals, or metal alloy, including at least one of gold, silver, platinum, palladium, rhodium, osmium, ruthenium, rhodium, rhenium, molybdenum, copper, iron, nickel, tin, beryllium, cobalt, antimony, chromium, manganese, zirconium, tin, zinc, tungsten, titanium, vanadium, lanthanum, cerium, heterogeneous mixtures thereof, or alloys thereof.

Figure 7A:
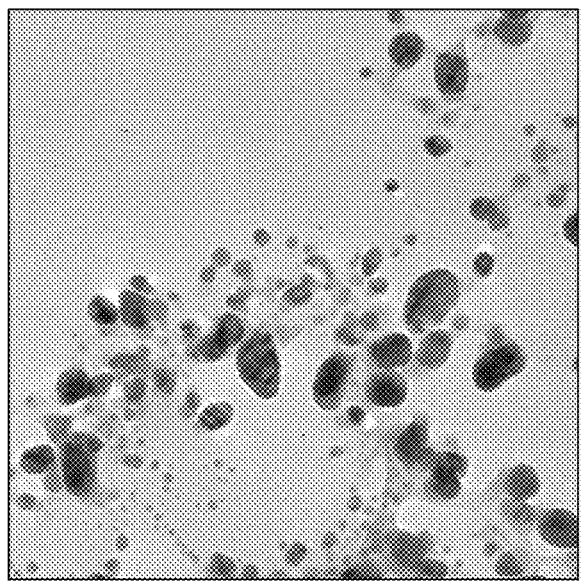
FIGS. 7A-7D show TEM images of various non-spherical nanoparticles (i.e., that have surface edges and external bond angles) made according to conventional chemical synthesis methods.
Figure 7B:
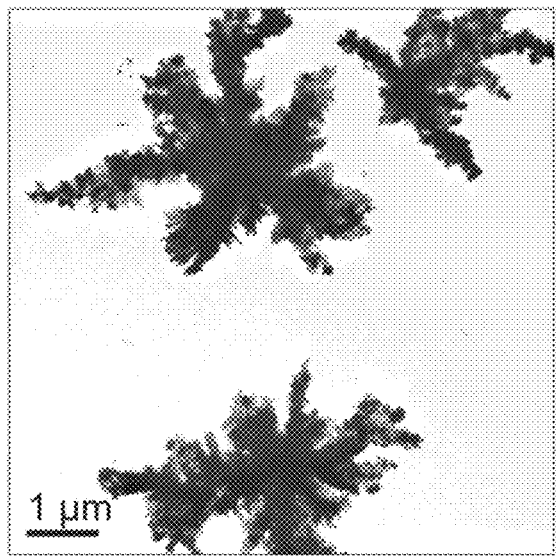
Figure 7C:
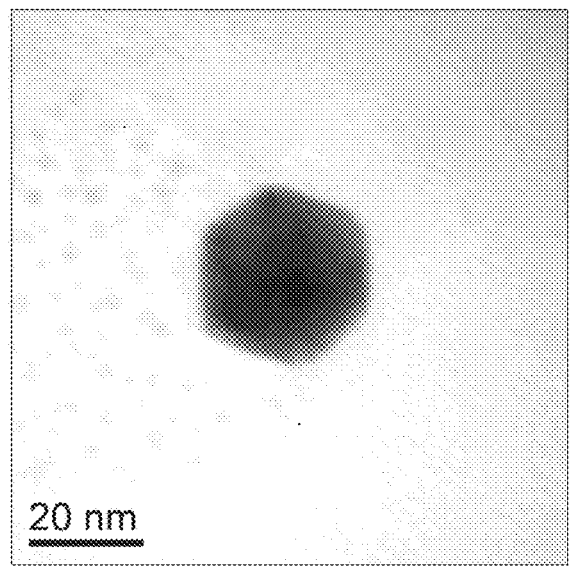
Figure 7D:
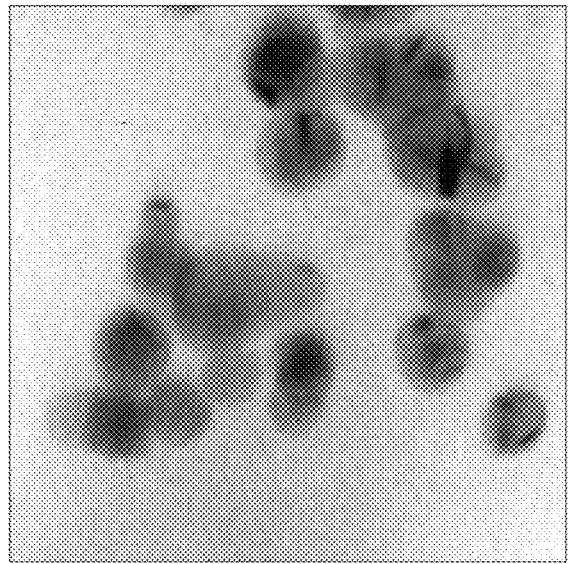

In contrast to coral-shaped and spherical-shaped nanoparticles as used herein, FIGS. 7A-7D show TEM images of nanoparticles made according to various chemical synthesis methods. As shown, the nanoparticles formed using these various chemical synthesis methods tend to exhibit a clustered, crystalline, or hedron-like shape rather than a true spherical shape with round and smooth surfaces. For example, FIG. 7A shows silver nanoparticles formed using a common trisodium citrate method. The nanoparticles are clustered and have a relatively broad size distribution. FIG. 7B shows another set of silver nanoparticles (available from American Biotech Labs, LLC) formed using another chemical synthesis method and showing rough surface morphologies with many edges. FIG. 7C shows a gold nanoparticle having a hedron shape as opposed to a truly spherical shape. FIG. 7D shows a set of silver nanoparticles (sold under the trade name MesoSilver), which have relatively smoother surface morphologies but are understood to be shells of silver formed over a non-metallic seed material.

Multi-Component Nanoparticle Compositions

In some embodiments, coral-shaped metal nanoparticles can be used together with spherical-shaped metal nanoparticles. In general, spherical-shaped metal nanoparticles can be smaller than coral-shaped metal nanoparticles and in this way can provide very high surface area for catalyzing desired reactions or providing other desired benefits. On the other hand, the generally larger coral-shaped nanoparticles can exhibit higher surface area per unit mass compared to spherical-shaped nanoparticles because coral-shaped nanoparticles have internal spaces and surfaces rather than a solid core and only an external surface. In some cases, providing nanoparticle compositions containing both coral-shaped and spherical-shaped nanoparticles can provide synergistic results. For example, coral-shaped nanoparticles can help carry and/or potentiate the activity of spherical-shaped nanoparticles in addition to providing their own unique benefits.

In some embodiments, a nanoparticle composition may comprise (1) a first set of metal nanoparticles having a specific particle size and particle size distribution, (2) and second set of metal nanoparticles having a specific particle size and particle size distribution, and (3) a carrier.

EXAMPLES

In the following Examples, a series of lead-acid batteries given different electrolyte treatments were tested for their ability to accept a charge and for various discharge performance indicators. Batteries were charged using a standard industrial battery charger, and were discharged using a DC to DC heater fan accessory. The various additives tested were added according to standard practices for maintaining appropriate electrolyte density. ICP-OES (inductively coupled plasma optical emission spectrometry) and EDS (scanning electron microscope and energy-dispersive X-ray spectroscopy) were used to verify nanoparticle location and concentration.

Throughout the Examples, the additive labeled or referred to as "Attostat Au" represents an additive including coral-shaped, gold nanoparticle compositions of the present disclosure (with size of about 25 nm). The nanoparticles of the additive labeled as "Synth Au" are standard, chemically synthesized gold nanoparticles with a hedron shape. The additive labeled "Cadsulf" is a commercially available cadmium sulfide-based electrolyte product marketed as a battery electrolyte enhancer. Each treatment was provided in a 40 ml volume. The 40 ml volume was diluted by approximately 10× when mixed with the electrolyte within the battery.

Example 1

Batteries in a chemically "dead" condition were unable to take a charge. The batteries were treated with 40 ml of an electrolyte treatment composition having 2 ppm Attostat Au in water. Results are shown in Table 1. As shown, the electrolyte treatment was able to revive the "dead" batteries and restore effective battery performance.

TABLE 1

Performance of Revived Batteries
(Treated with 40 ml Attostat Au
at 2 ppm concentration)

| Battery Model | Charge Capacity (Amp-hours) |
| --- | --- |
| Everstart Marine 24 MS | 50.8 |
| Unlabeled automobile battery | 49.2 |

Example 2

Dead batteries for a small rider mower (battery model: Everstart U1R7) were unable to take a charge. The batteries were treated with various electrolyte treatments to determine the ability to recover the batteries. Results are shown in Table 2 below. In Table 2, the "First Discharge" column provides data related to the first discharge of the battery following treatment and initial charging of the battery. Batteries were subsequently charged again and then retested to provide the data in the "Second Discharge" column.

TABLE 2

Charge Capacity (Amp hours)
of Dead Batteries Following Treatment

| Additive (40 ml) | First Discharge | Second Discharge |
| --- | --- | --- |
| Attostat Au 2 ppm | 9.2 | 14.7 |
| Synth Au 2 ppm | 9.2 | 12.4 |
| Cadsulf | 6.6 | 10.2 |

As shown, the battery treated with Attostat Au nanoparticles showed the best results, particularly during the second discharge. It is theorized that while the chemically synthesized Au treatment gave positive initial results, the superior ability of the nanoparticles of the Attostat Au treatment to remain stable in solution better sustains positive effects over time.

Example 3

Several new batteries (battery model: Autocraft 65-2) were subjected to a series of discharge and charge cycles prior to treatment of the electrolyte. Following treatment, the batteries were again subjected to a series of discharge and charge cycles. Charge capacities of the batteries were measured to determine whether the treatment would have an effect over successive discharge/charge cycles. For each treatment, successive discharge/charge cycles were conducted (up to three) until performance was shown to (1) improve or be unaffected, or (2) decrease by more than 50%. Results are shown in Table 3.

TABLE 3

Charge Capacity (Amp hours)
of New Batteries Following Treatment

| Additive (40 ml) | First Discharge | Second Discharge | Third Discharge |
| --- | --- | --- | --- |
| Attostat Au 2 ppm | 42.1 | 50.8 | |
| Synth Au 2 ppm | 52.2 | 48.7 | 47.3 |
| Cadsulf | 48.2 | 12.4 | |

As shown, the battery treated with Attostat Au saw improved performance between successive discharge/charge cycles, whereas the battery treated with chemically synthesized Au saw steady degradation of performance over successive discharge/charge cycles. The battery treated with the Cadmium Sulfide product saw significant degradation after the first post-treatment discharge.

In the above results, the trend from one discharge/charge cycle to the next is likely more important to battery longevity and performance than the initial charge capacity immediately following treatment. It is theorized that while the chemically synthesized Au treatment gave positive initial results, the superior ability of the nanoparticles of the Attostat Au treatment to remain stable in solution better sustains positive effects over time.

Example 4

Figure 8A:
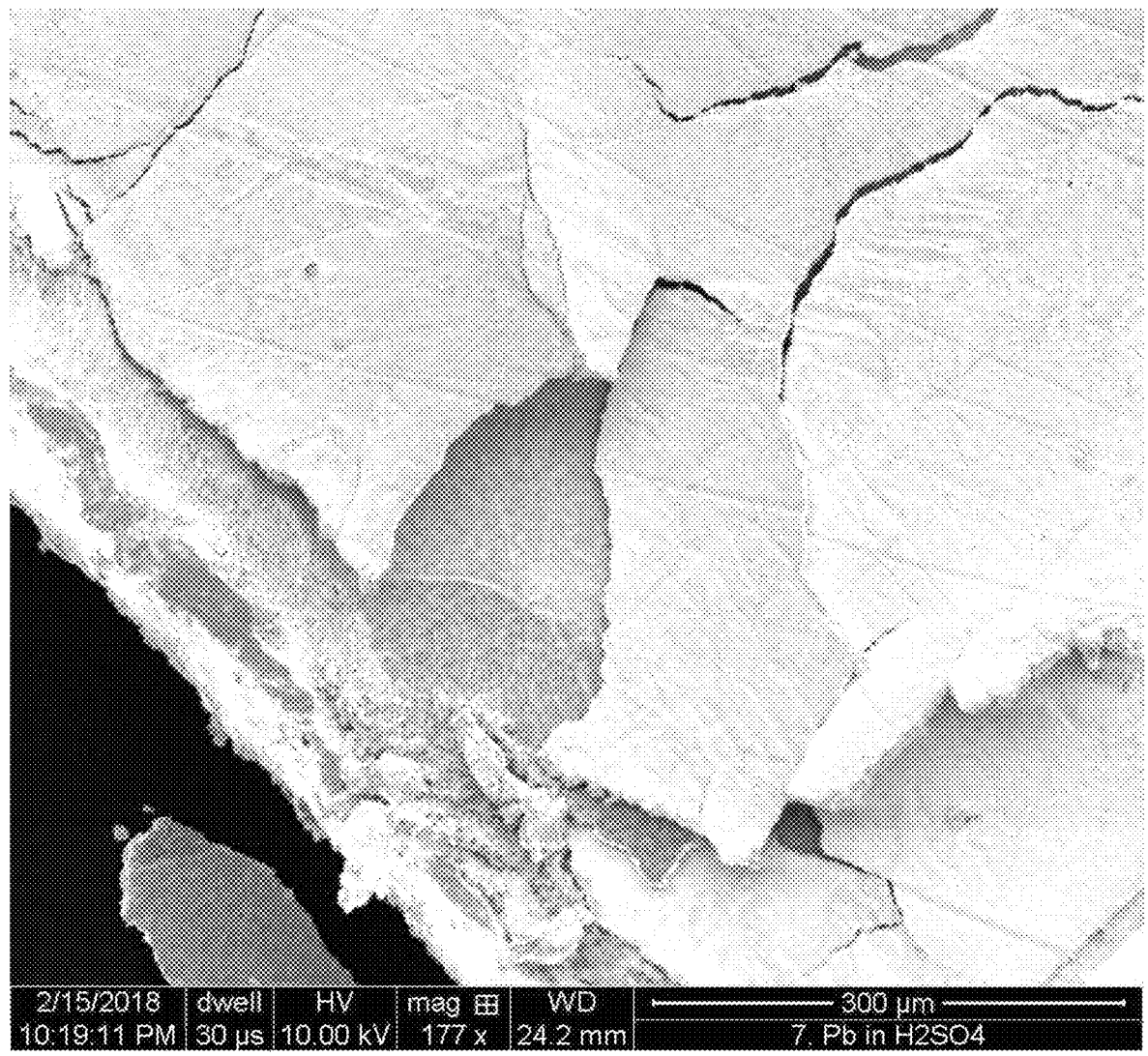
FIGS. 8A and 8B show images of a battery plate from an untreated lead-acid battery.
Figure 8B:
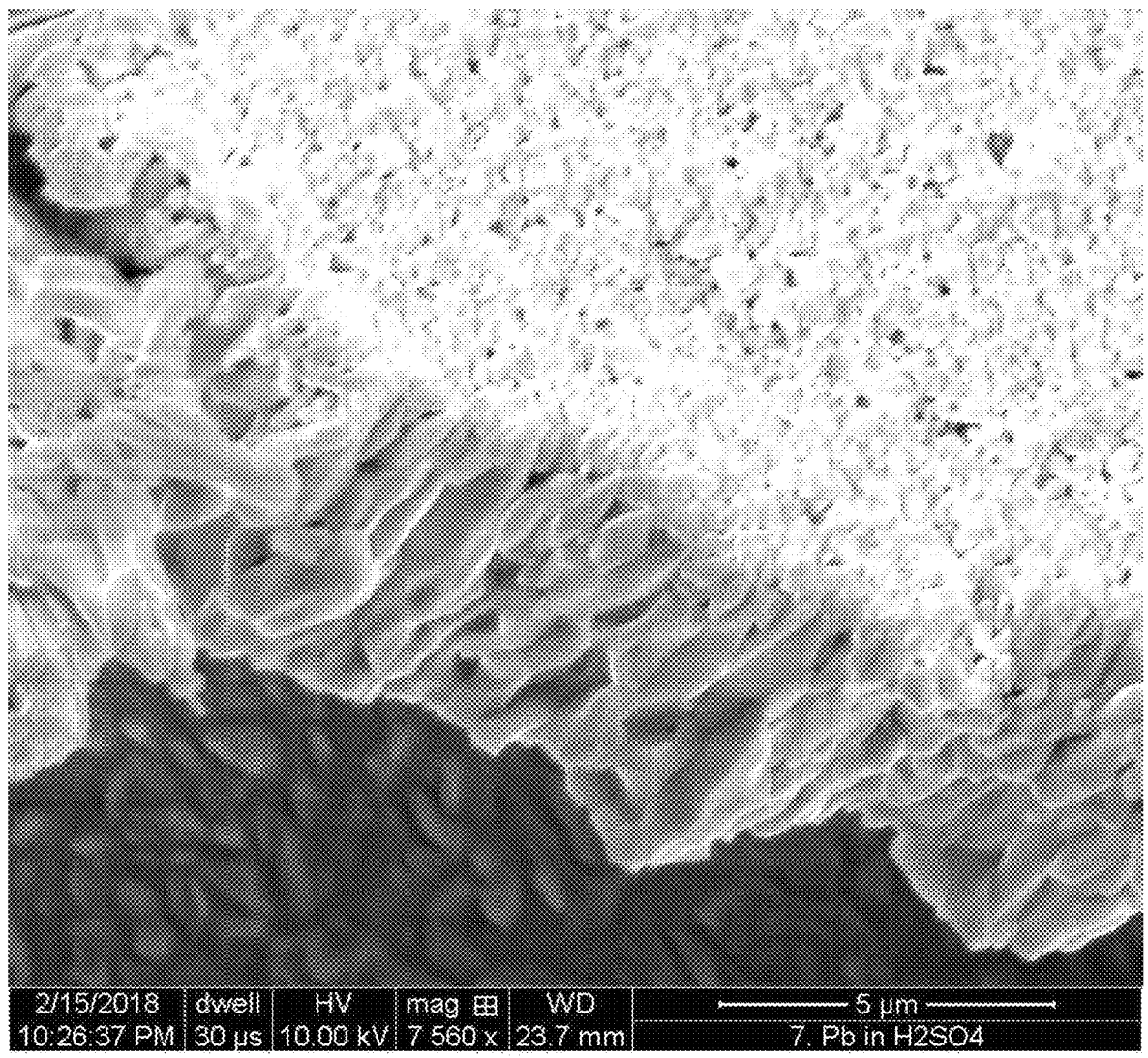

Images of a plate from an untreated lead-acid battery were obtained and are shown in FIGS. 8A and 8B. FIG. 8A shows an edge section of $PbSO_4$ buildup on the electrode plate. FIG. 8B is a magnified view of the same $PbSO_4$ buildup of FIG. 8A. The edge view of FIG. 8B illustrates the relatively large crystalline structure of the $PbSO_4$ buildup. Such crystals resist disassociation during battery recharging and can lead to degradation of battery performance over time.

Figure 9A:
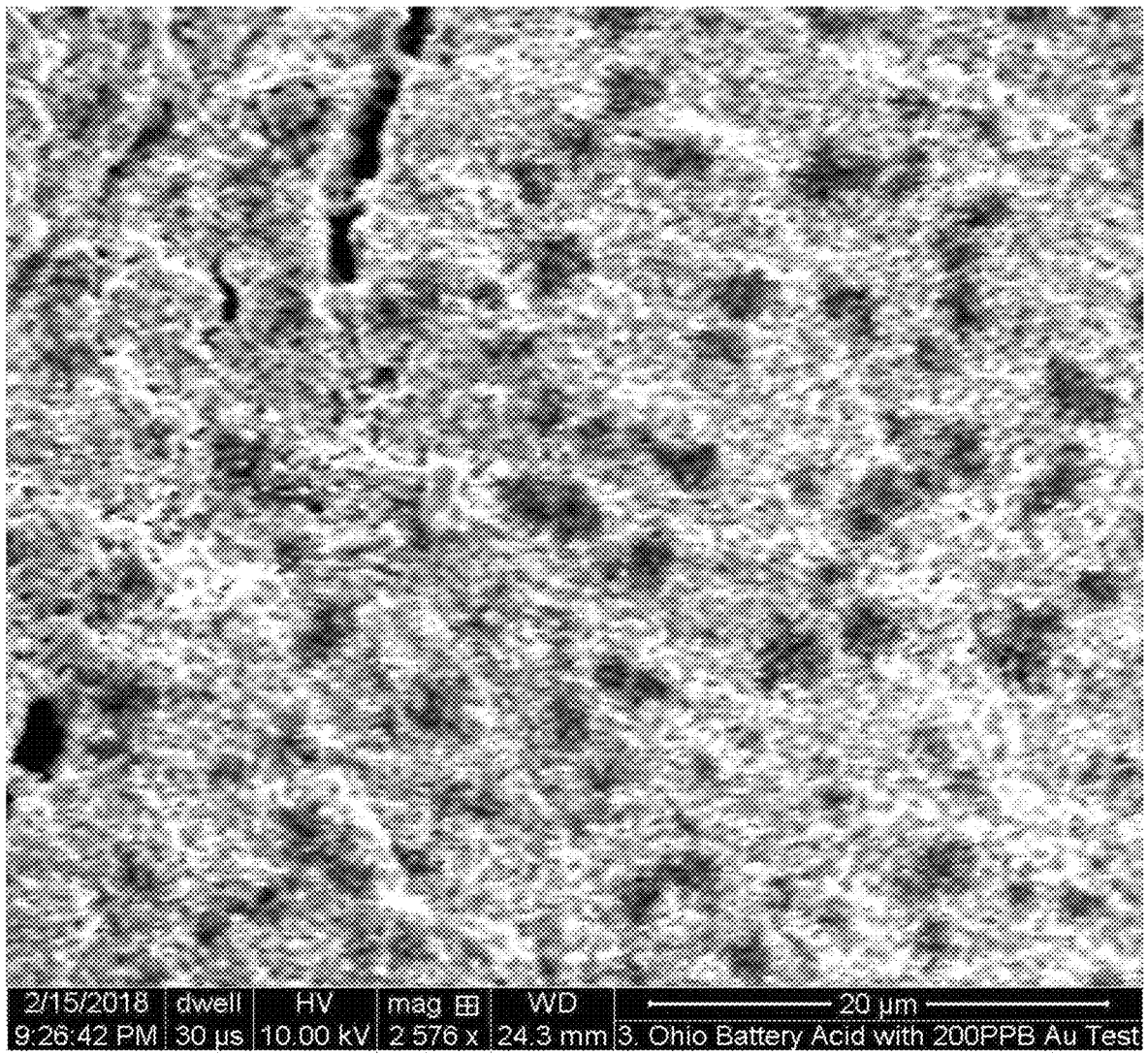
FIGS. 9A and 9B show images of a battery plate from a lead-acid battery treated with Au coral-shaped nanoparticles at a concentration in the electrolyte of 200 ppb.
Figure 9B:
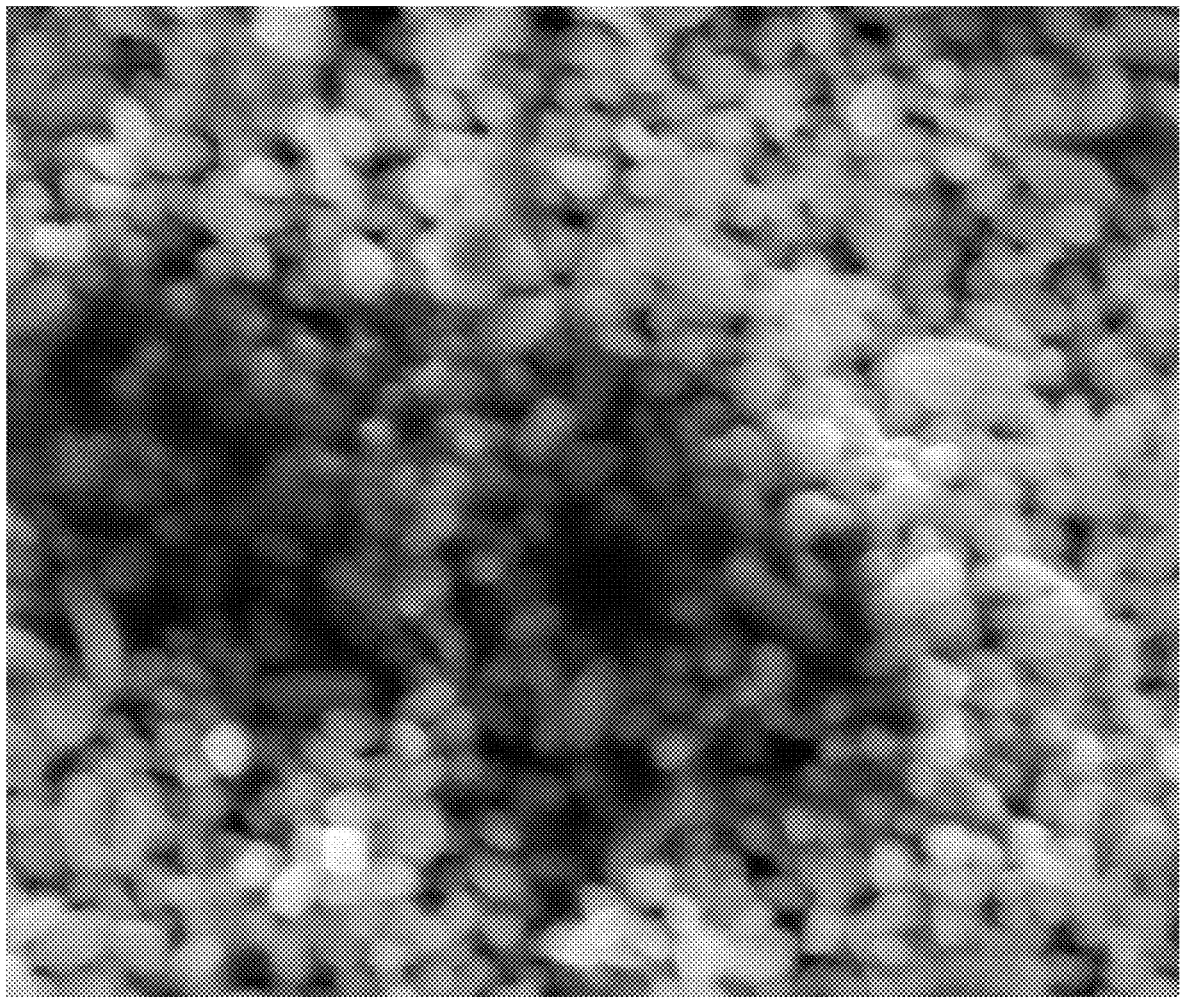

As a comparison, images of a plate from a similar lead-acid battery that had been treated with 200 ppb Au coral-shaped nanoparticles were obtained and are shown in FIGS. 9A and 9B. From the vantage of FIG. 9A, several darker spots where "craters" have been formed within the $PbSO_4$ layer are visible.

Without being bound to any particular theory, it is believed that the added nanoparticles associate with grain boundaries at the plate surface and alter the electropotential differences between grain boundaries. The craters result because one or more nanoparticles at a crater site prevent excessive $PbSO_4$ buildup during battery discharge, whereas $PbSO_4$ continues to be deposited at other areas surrounding the crater. The nanoparticles thus function to maintain a greater surface area of exposed underlying Pb or $PbO_2$, which better maintains the ability for effective ion transfer to the electrode plate.

FIG. 9B illustrates a magnified view of a crater such as shown in FIG. 9A. As confirmed by EDS, the lighter sections of the image (i.e., the sections surrounding the crater) have a higher proportion of oxygen than the darker sections (i.e., the sections deeper within the crater), indicating that the crater exposes more of the underlying Pb electrode surface relative to the higher levels of $PbSO_4$ surrounding the crater.

Example 5

Figure 10A:
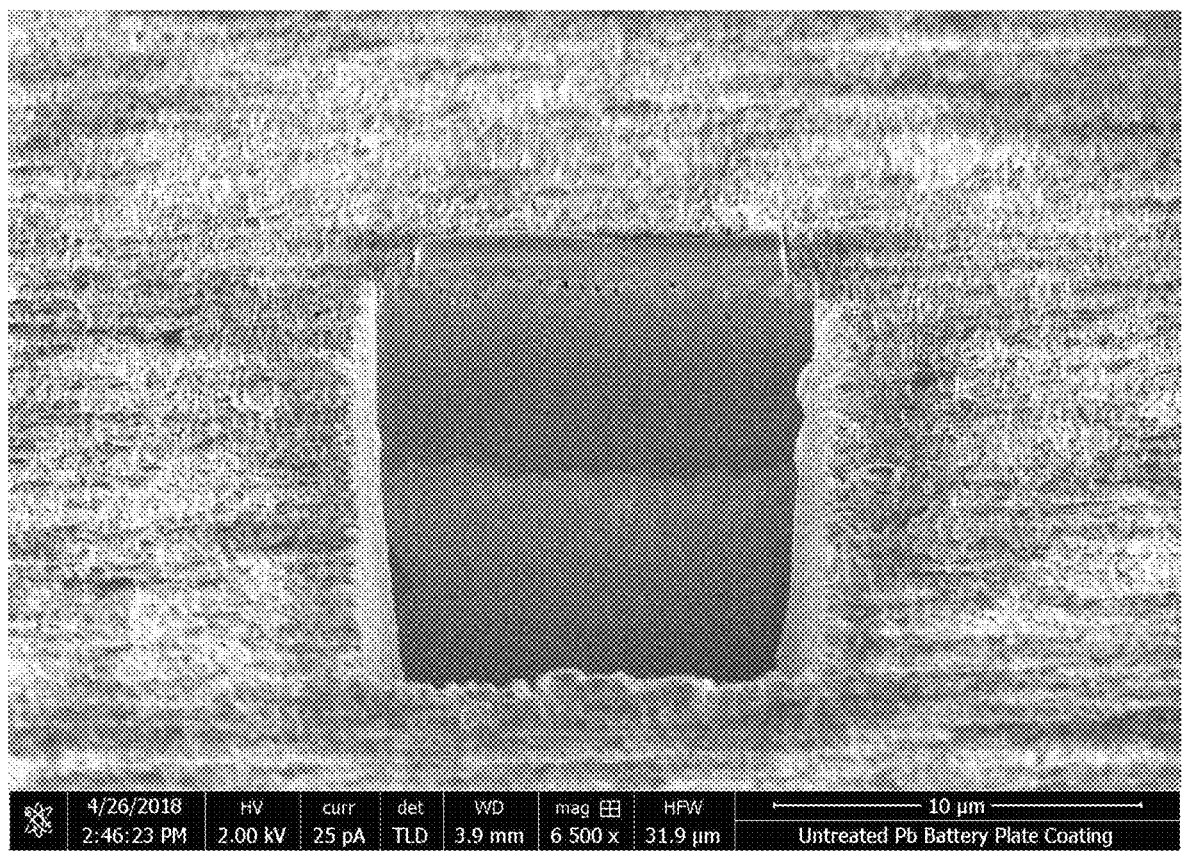
FIGS. 10A and 10B show additional images of an untreated lead-acid battery.
Figure 10B:
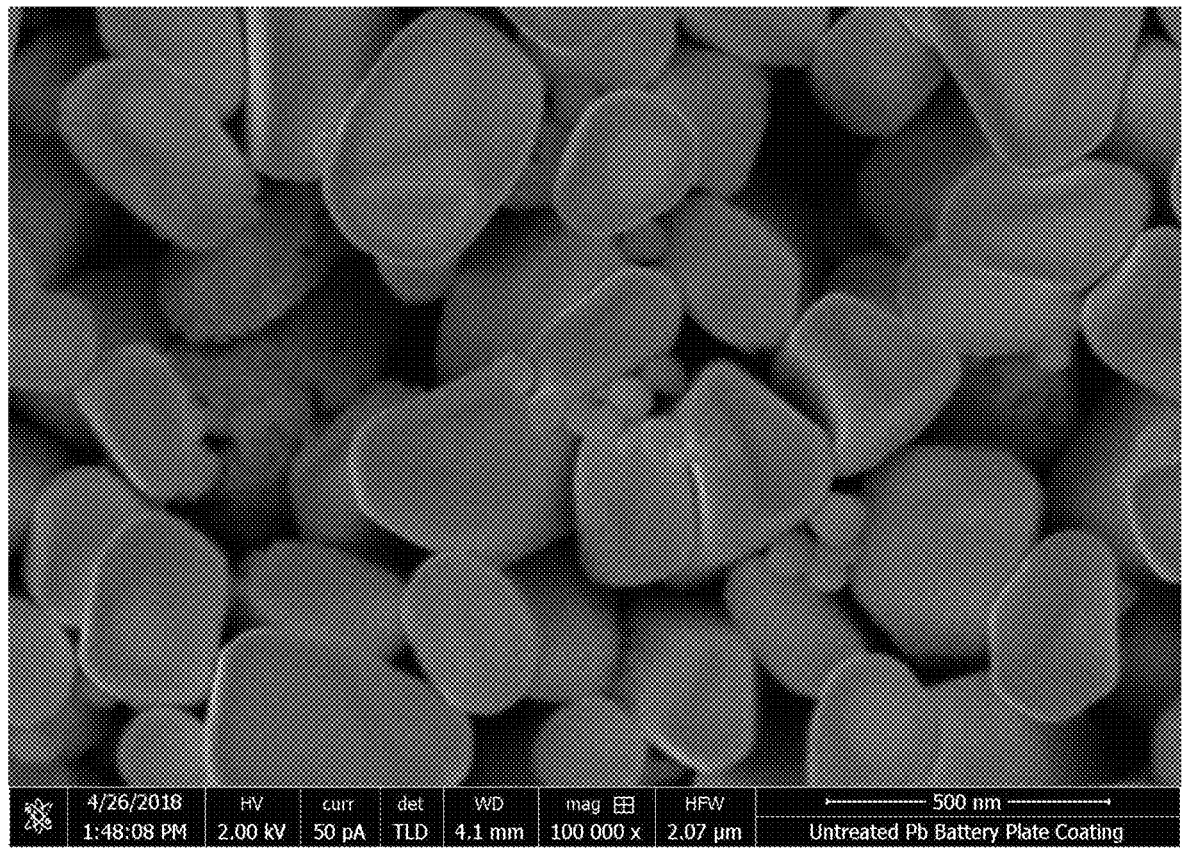

Images of a plate from an untreated lead-acid battery were obtained and are shown in FIGS. 10A and 10B (the visible cutout of FIG. 10A was intentionally applied for cross-sectional visualization). The relatively large size of $PbSO_4$ crystals are visible in the magnified view of FIG. 10B.

Figure 11A:
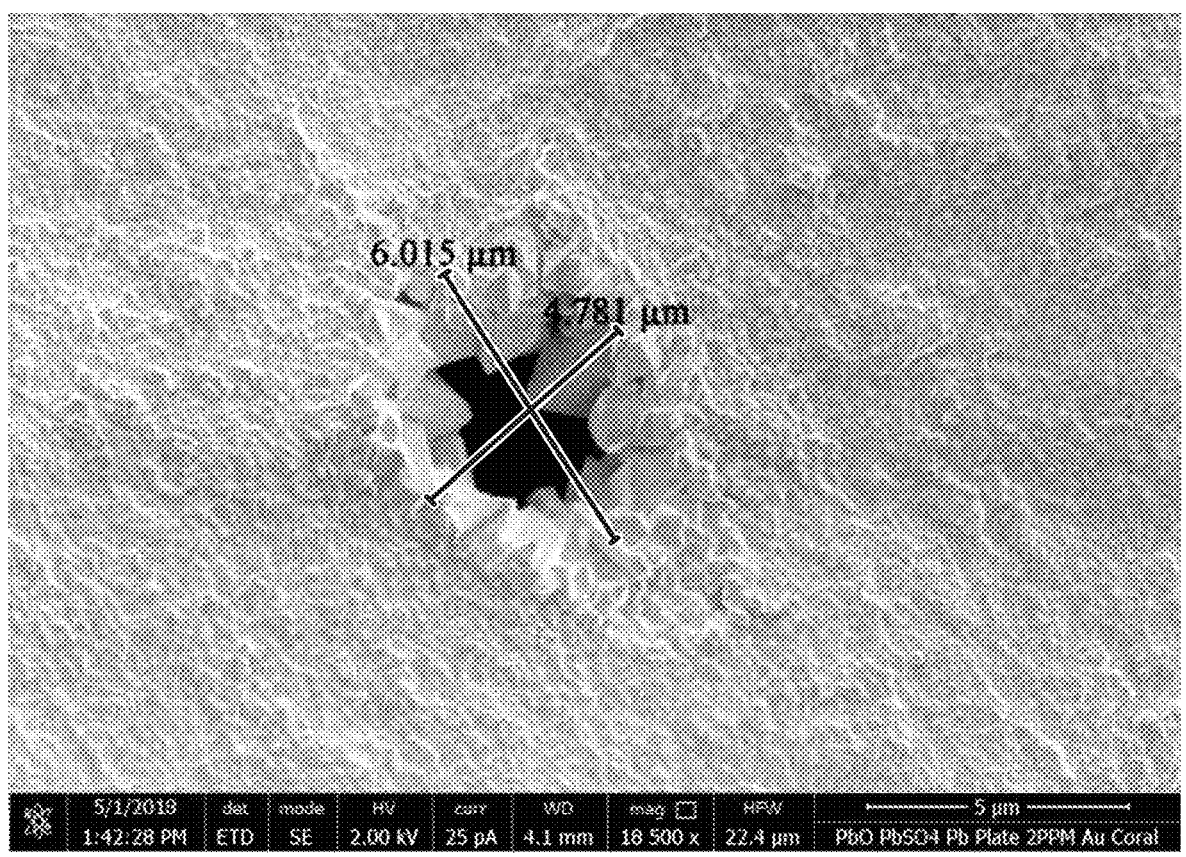
FIGS. 11A and 11B show the surface of a plate from a battery treated with Au coral-shaped nanoparticles at a concentration in the electrolyte of 2 ppm.
Figure 11B:
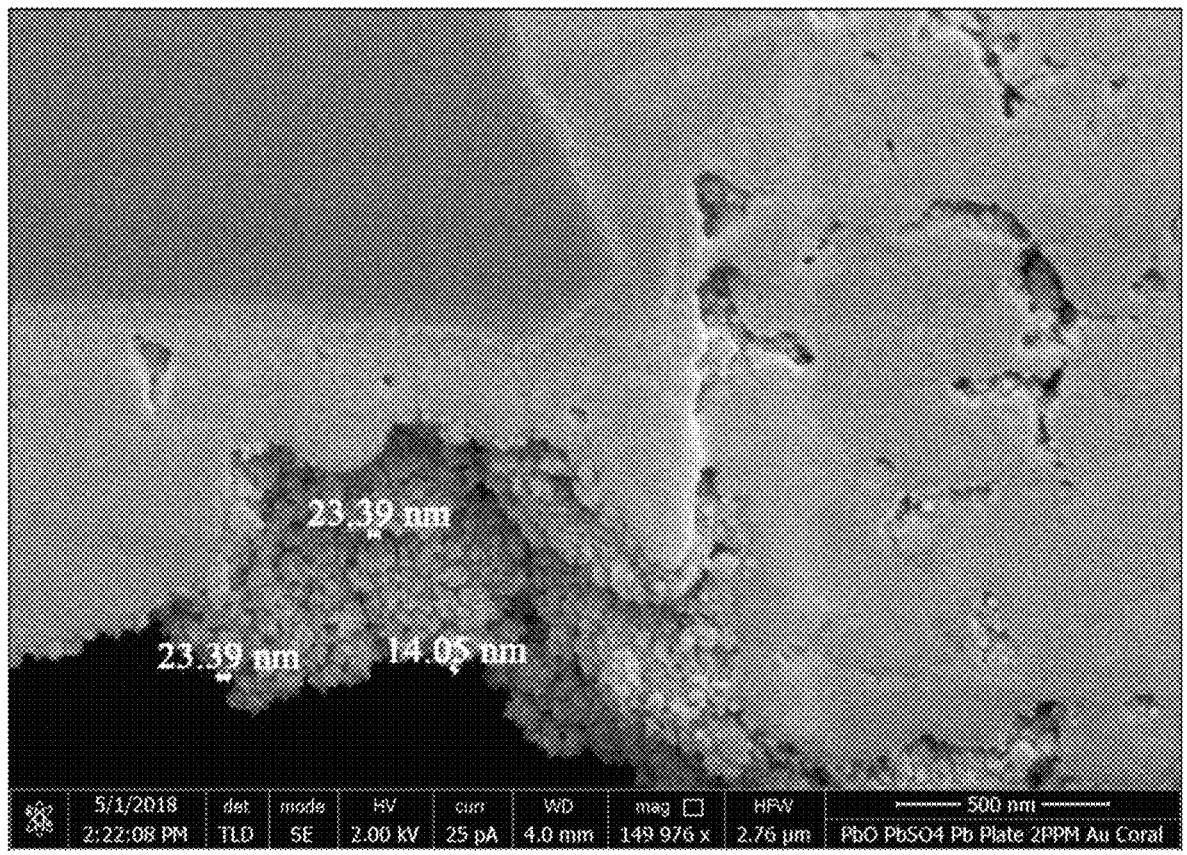

As a comparison, FIGS. 11A and 11B show the surface of a plate from a battery treated with 2 ppm Au coral-shaped nanoparticles. An edge of the crater shown in FIG. 11A is shown in magnified view in FIG. 11B. The grain sizes of the $PbSO_4$ layer shown on the visualized edge, which are on the order of 10 to 30 nm, are much smaller than the large crystalline structures shown in FIG. 10B. The treated plates are therefore benefitted in that 1) the formed craters provide better effective access to the underlying electrode surface and less resistance to ion transfer, and 2) at least some of the $PbSO_4$ formed on the electrode plate is in a more-preferred smaller grain form that more readily disassociates as compared to larger crystals.

Example 6

A comparative test was performed comparing the performance of new lead-acid batteries (Napa brand, size 7565 batteries), one of which was untreated and one of which was treated by adding gold coral-shaped nanoparticles to the electrolyte to a concentration of between 200 ppb to 2 ppm. Discharge/charge cycling performance data was measured according to the standard test procedure BCIOS-06 Rev 10-2012, Section 3.

Testing was carried out according to the following:

Test Initiation:

At the completion of pretest conditioning, record on-charge voltage, charging rate, temperature, and specific gravity. When all requirements of capacity test conditions were met, the discharge was initiated within 24 hours.

Discharge Cycle:

Mono-blocks and/or battery packs of the test circuit were discharged at the selected constant current discharge rate until the terminal voltage reached 1.75 volts per cell. The discharge time and capacity was recorded in minutes or amp-hours and the % of Rated Capacity was calculated by dividing the discharge capacity by the published rated capacity for that discharge rate. These data points were plotted on a cycle life curve with either Discharge Capacity or % of Rated Capacity plotted against Cycle Number.

Charge Cycle:

Mono-blocks and/or battery packs of the test circuit were recharged per the battery manufacturer's charging recommendations.

Rest Periods:

Following the charge cycle as above, an optional rest period not to exceed eight hours was provided in order to allow the mono-blocks and/or battery packs of the test circuit to cool such that the temperature requirements were maintained.

Electrolyte Level & Specific Gravity

In those batteries with electrolyte access, the electrolyte levels were maintained by periodic water additions in accordance with manufacturer's instructions or such that the level of electrolyte was maintained at a minimum of 6 mm (0.25 in.) above the top of the separators.

Figure 12A:
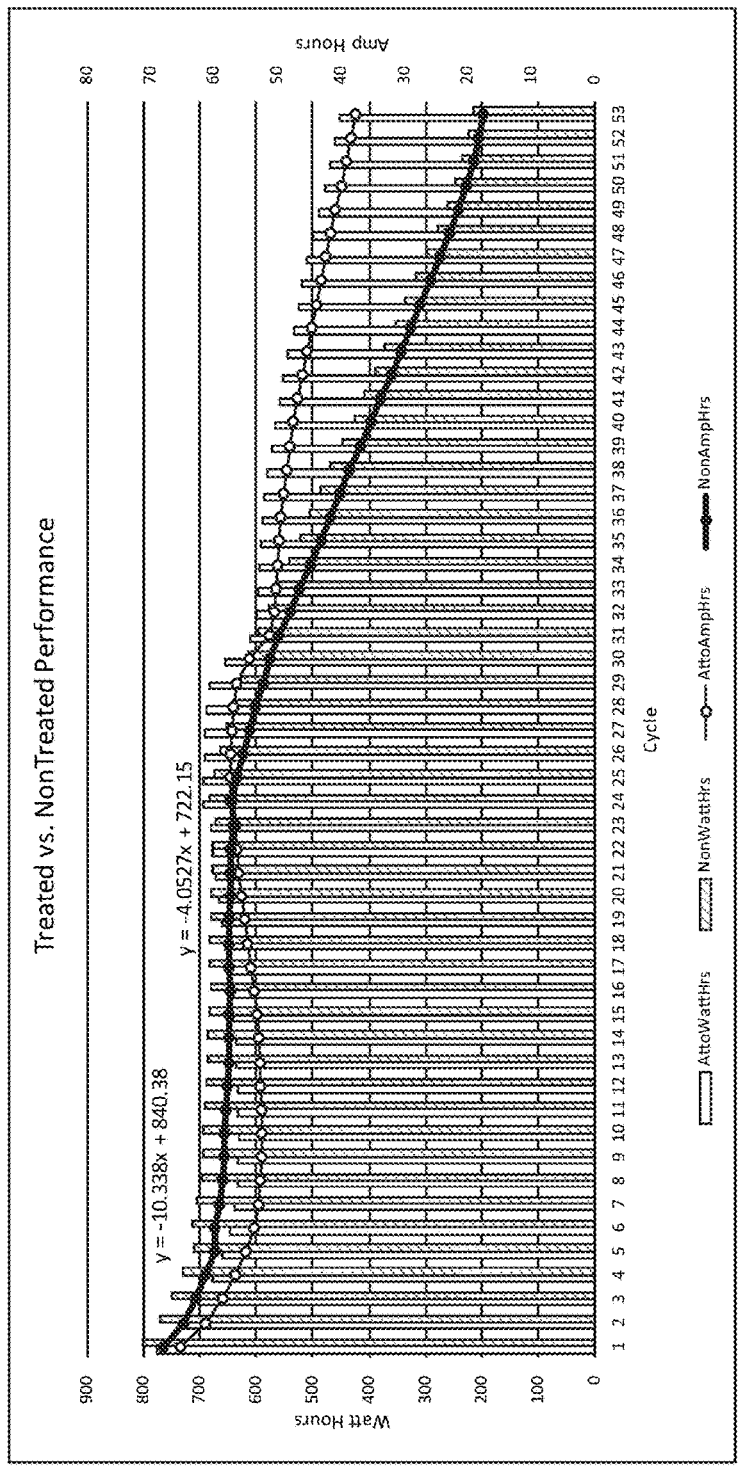
FIGS. 12A and 12B show the results of a comparative performance test between an untreated battery and a battery treated with Au coral-shaped nanoparticles.
Figure 12B:
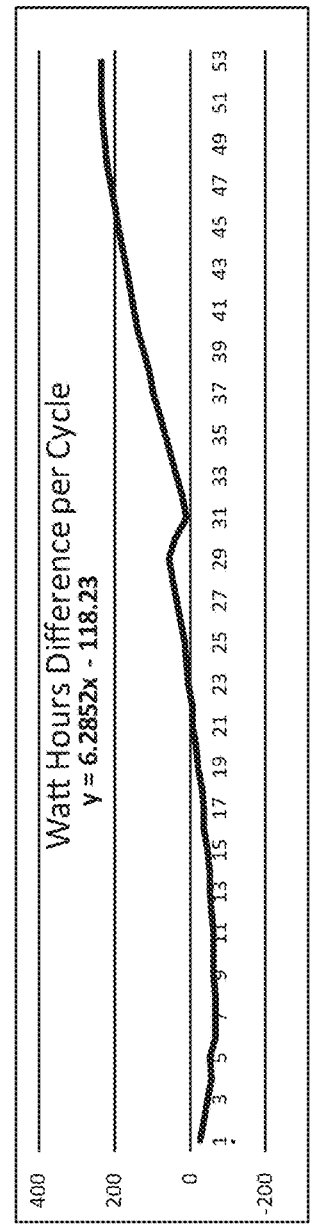

Results:

The comparative testing results are shown in FIGS. 12A and 12B. In FIG. 12A, "AttoWattHrs" and "AttoAmpHrs" represent the performance metrics of the treated battery, while "NonWattHrs" and "NonAmpHrs" represent the performance metrics of the non-treated battery. As shown, both batteries provided similar performance with respect to both watt hours and amp hours until about cycle 22. After cycle 22, the performance of the non-treated battery began to degrade much faster than the treated battery.

At cycle 30, the treated battery was accidentally overcharged, causing some of the electrolyte to boil and causing the relatively abrupt dip in performance. The accidental overcharge was a result of the treated battery reaching a charged state much faster than expected. While the faster charging capability of the treated battery was a surprising benefit of the treatment, the accidental overcharge resulted in an unfortunate dip in performance relative to its expected potential. Nevertheless, despite the overcharging incident, the treated battery continued to provide better performance in both watt hours and amp hours as compared to the nontreated battery as can clearly be shown in the plot of FIG. 12A.

FIG. 12B relates to the same performance data and shows the difference in watt hours between the treated and non-treated battery at each cycle. As shown, as the number of cycles continued, the difference in performance grew increasingly greater.

Example 7

Samples of the electrolyte from tested batteries, as well as CV test cell, were processed through ICP-OES to determine concentrations. The original amount of Attostat Au concentration of the Au nanomaterial in electrolyte measured to 0.15-0.2 mg/L. The concentration measure with ICP-OES did not show significant fallout or absorption with readings showing that concentrations were maintained at 0.15-0.20 mg/L at the end of experiments. This occurred even though the testing environment had significantly more variables than a table top in-situ test.

Example 8

Based upon published research and reference literature on lead acid cyclic voltammetry (CV) testing, the following experiment was performed. Sample rate of 25 samples per second, Minimum Voltage of −0.74V and a Maximum of 1.8V, rate of 0.065 V/sec were programmed into an IO Rodeostat potentiostat using a Gamray EuroCell as the vessel. A Calomel probe was chosen for reference with the understanding that temperature control would be required for accurate readings. A Buchi Rotovap bath was used with ethylene glycol as the bath media and kept at 30 C (measured), which the EuroCell was immersed for the experiment. The counting electrode was a solid pure lead cylinder 1.25 cm in diameter and 1.25 cm in length threaded onto a stainless steel rod in the center of the EuroCell. The working electrode is the same foil that was used in the SEM imaging and cut to allow insertion to an exterior port of the EuroCell. ICP-OES was used to verify the concentrations of Attostat Au which were then diluted according to volumes in the EuroCell and in some working electrode preparation baths, to achieve a 0.2 mg/L (200 ppb) levels. Also to mitigate noise in the system a 0.01 uF capacitor was linked between the counting electrode and the calomel reference electrode as per instruction from the manufacturer of the IO Rodeostat potentiostat system.

Analysis Software and Computational Programming:

The data was collected with libraries provided by the manufacturer of the IORodeo Potentiostat and implemented in Python scripting language on a Linux OS system. The files collected required further review and analysis techniques that were performed and programmed in Matlab using the Savitsky-Golay filtering technique to acquire the most accurate curves possible from the raw data provided by the IORodeostat. The data was finally reviewed in Origins software with the CV application to provide information on the curves of the CV and extrapolation of peak heights, positions and integrations under the CV curves. Excel was used to plot comparisons for review.

Preparation of Electrode Surfaces:

A 10 g/L citric acid solution was used to clean off existing oxide layers of the working electrode lead foil before immediately being introduced to an oxidizing solution of 3% $H_2O_2$ with and without Attostat Au present at a concentration of 0.2 mg/L (200 ppb). Although in the literature the use of hydrogen peroxide was not used for creating an oxidation layer on the lead working electrode, this proved efficacious without potentially adding contaminants. No $H_2O_2$ was used in the electrolyte of the CV cell and care was taken to only introduce dry electrodes after lead oxide formation was completed. For each CV test the electrodes were treated as so:

1 and 2. Electrode in 3% $H_2O_2$ for 2 hours
3. Electrode in 3% $H_2O_2$ and 200 ppb Attostat Au for 2 hours
4. Electrode in 3% $H_2O_2$ and 200 ppb Attostat Au for 24 hours.

CV Experiment 1:

A baseline was performed and monitored via the computer interface to the potentiostat. The counting and working electrode along with the reference calomel electrode were placed in the EuroCell along with 1.27 kg/L sulfuric acid to the port levels of the Cell. CV runs were performed until the data graphs showed equilibrium. Some final equilibrium level runs were recorded.

CV Experiment 2:

Without changing the electrodes or electrolyte from Experiment 1, a solution of Attostat Au by volume to create a 0.2 mg/L concentration of nanoparticles was introduced to the electrolyte and allowed to diffuse into an even mixture. The program was again run until equilibrium was detected in the graphs, then individual runs recorded for analysis.

CV Experiment 3:

CV Experiment 3 Without changing the electrolyte in the EuroCell the working and counting electrodes were removed. The counting electrode was resurfaced with 1200 grit sand paper and citric acid washes. A new electrode treated in a bath of $H_2O_2$ for 2 hours with the additional presence of 0.2 mg/L of Attostat Au was created. Noted that the rapid coating of lead oxide was not seen showing an inhibiting effect of the presence of the Attostat Au in electrode preparation. The counting and working electrode were placed in the Eurocell in same positions as previous experiments and CV cycles run until equilibrium was met. Individual runs for analysis were taken after equilibrium was reached.

CV Experiment 4:

Due to the inhibiting factor of the Attostat Au in the $H_2O_2$ oxide layer process, another working electrode was produced in the $H_2O_2$ and 0.2 mg/L Attostat Au bath for a period of 24 hours. The counting electrode was resurfaced and cleaned, then introduced back into the EuroCell with the working electrode having more of an oxide coating then the 2 hour treatment in Experiment 3. CV cycles were run until equilibrium was achieved. Individual runs for analysis were taken after equilibrium was observed in the multi run graphs.

Figure 13A:
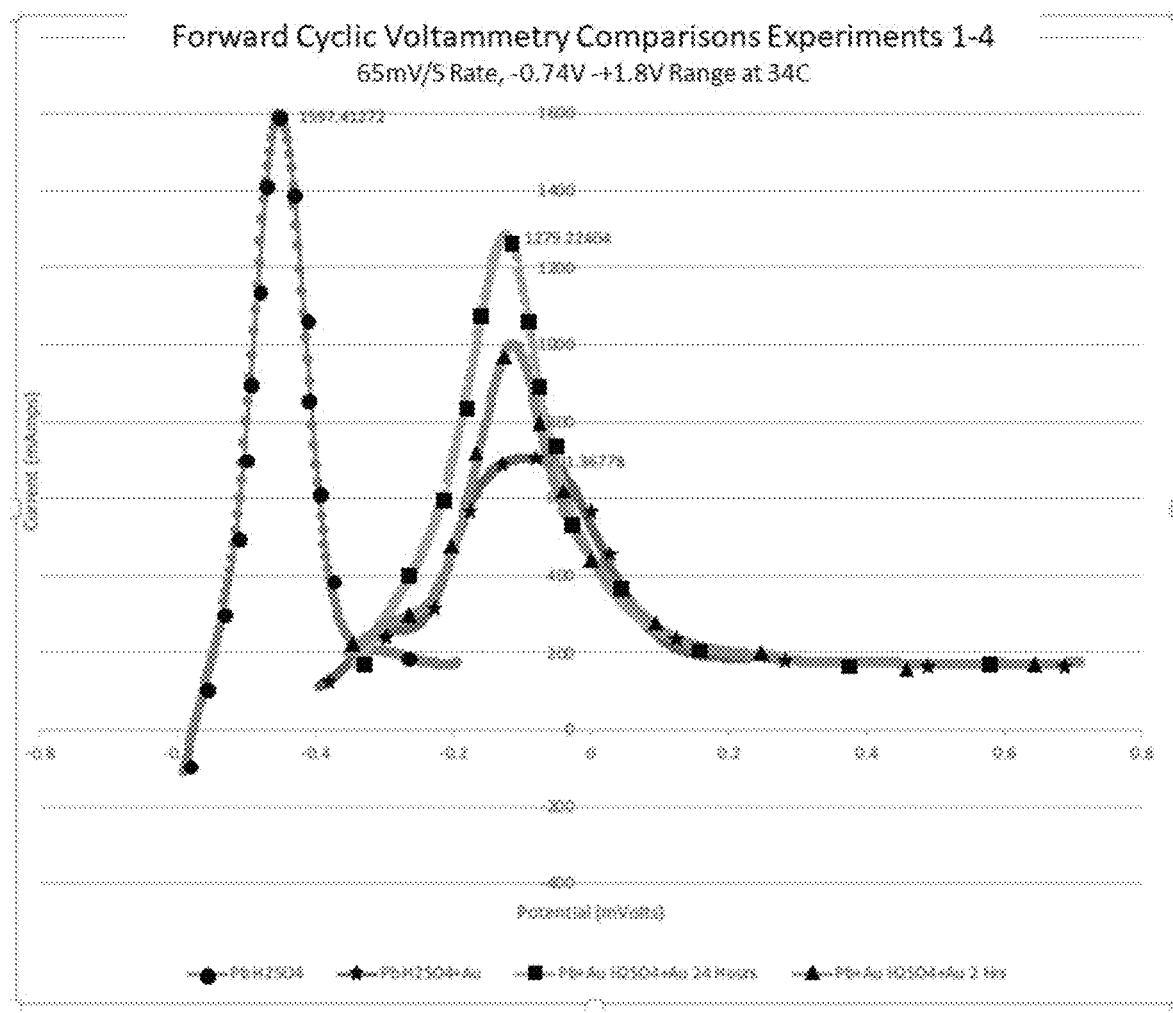
FIGS. 13A through 13E illustrate the results of cyclic voltammetry (CV) testing of untreated and nanoparticle treated batteries.

Results:

FIG. 13A shows the forward cyclic voltammetry comparisons of Experiments 1-4 at equilibrium. The potential at which the current peaks are observed are significantly different between electrolyte with and without Attostat. The area under the peaks which correlates to amounts of oxide produced is largest in the 24-hour treated working electrode with Attostat Au in electrolyte but with a lower current peak then that of the baseline. Also the potential difference between beginning and ending of the peaks is greater than the baseline peaks.

Figure 13B:
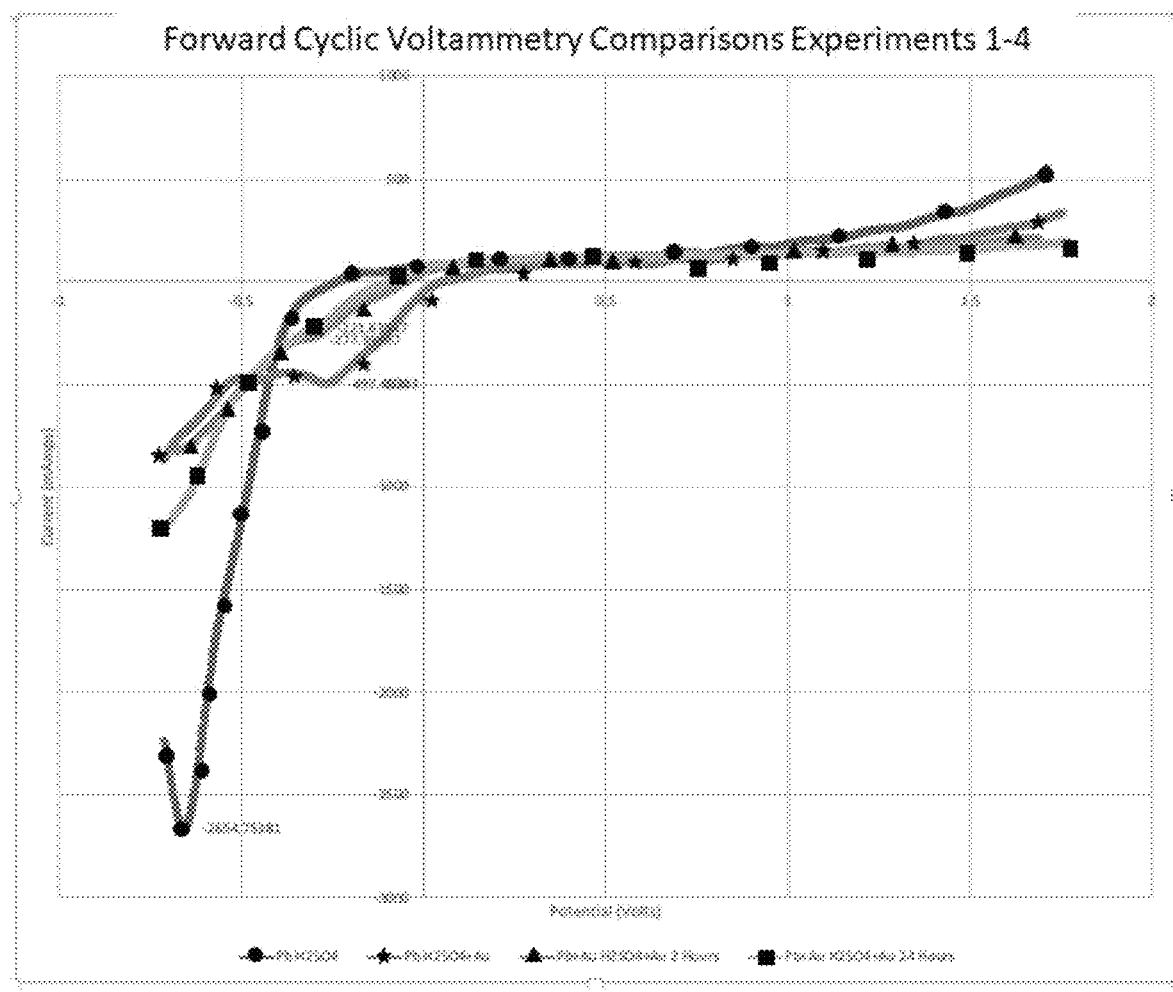

FIG. 13B shows the backward CV comparisons of Experiments 1-4 at equilibrium. In relation to baseline the potential at which the valleys start are earlier in the 2, 3, and 4 experiments. The electrolyte only addition of Attostat Au possesses a valley that is earlier than the baseline which appears to diminish to almost unnoticeable in the electrolyte and working electrode surface treatments with Attostat Au. As these experiments were designed around published settings it is unknown if the curves may be at more negative potentials than the baseline and require modification of the test to include that change in the cycle minimum voltage setting.

Figure 13C:
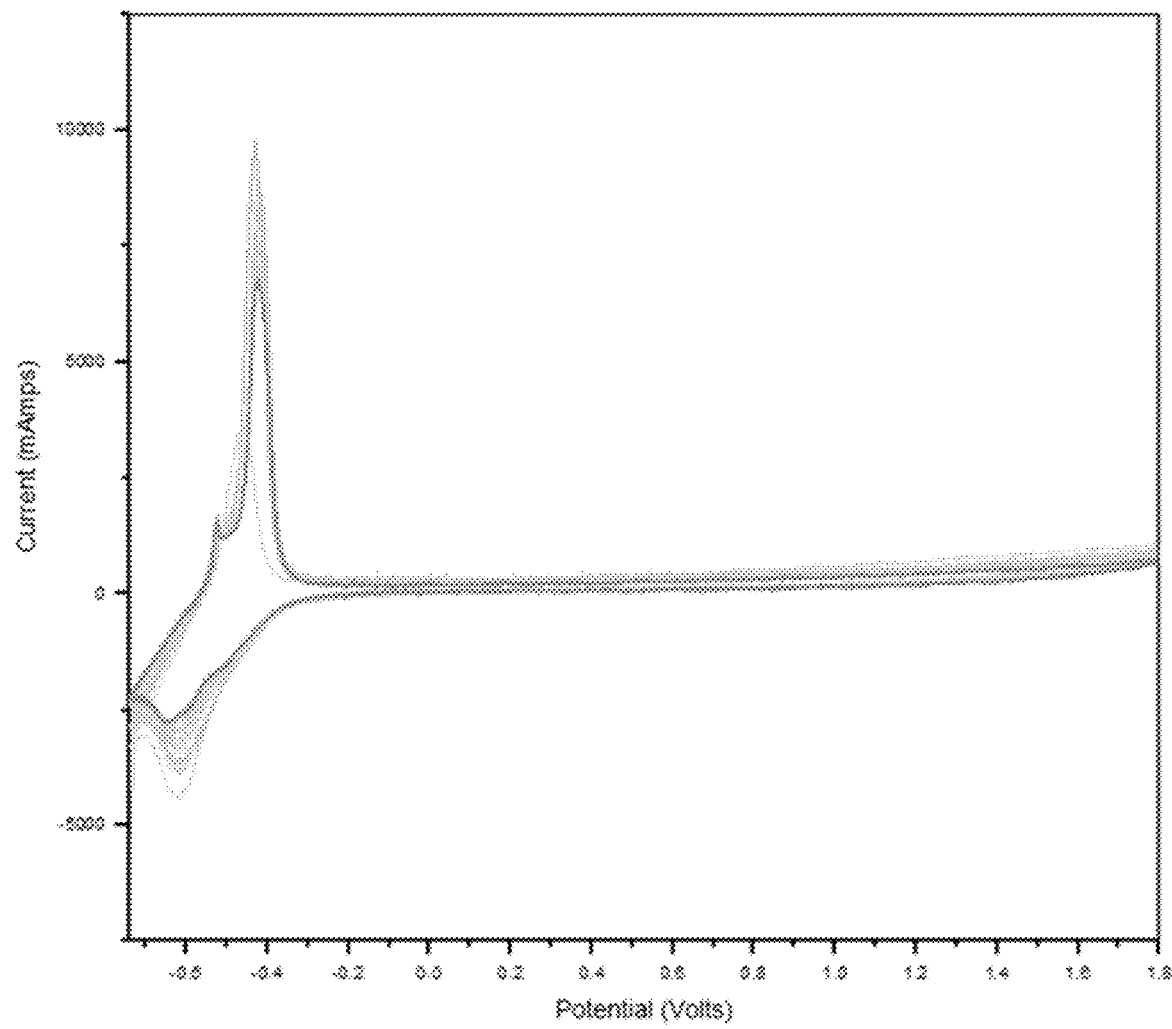
Figure 13D:
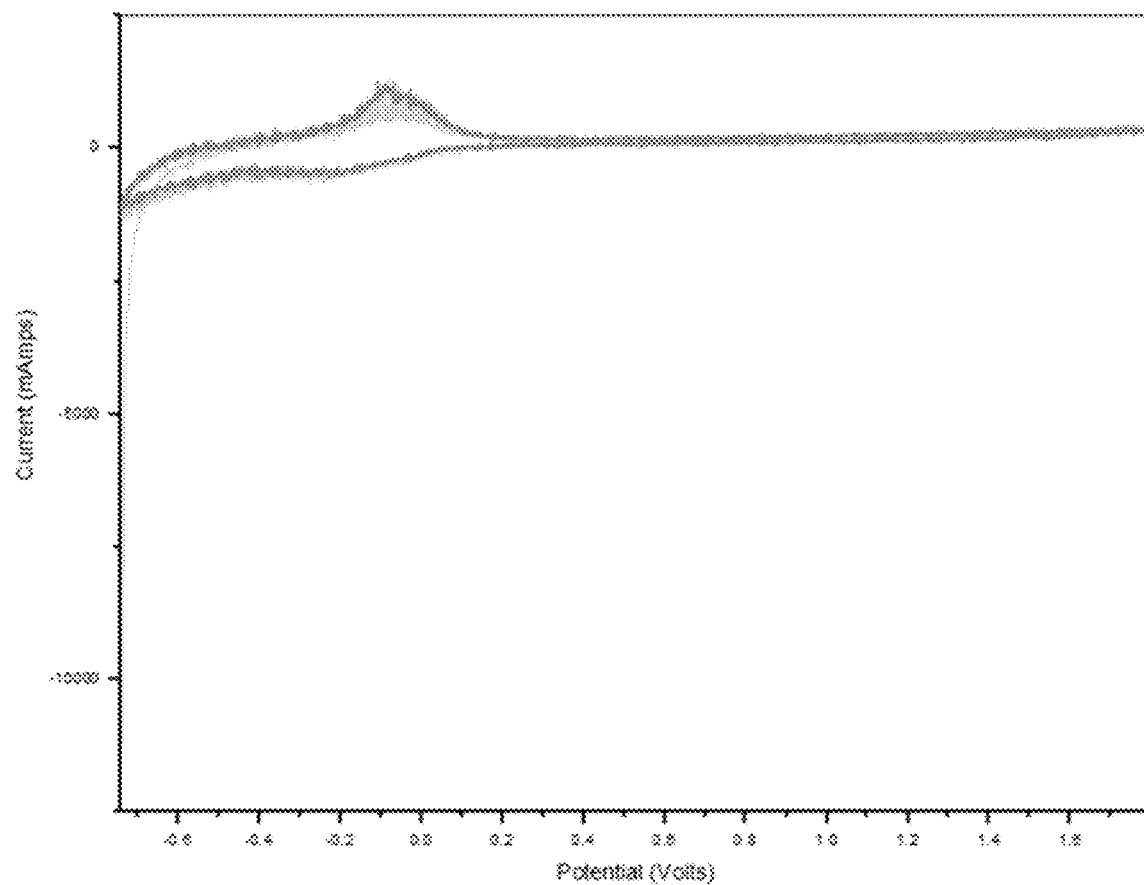
Figure 13E:
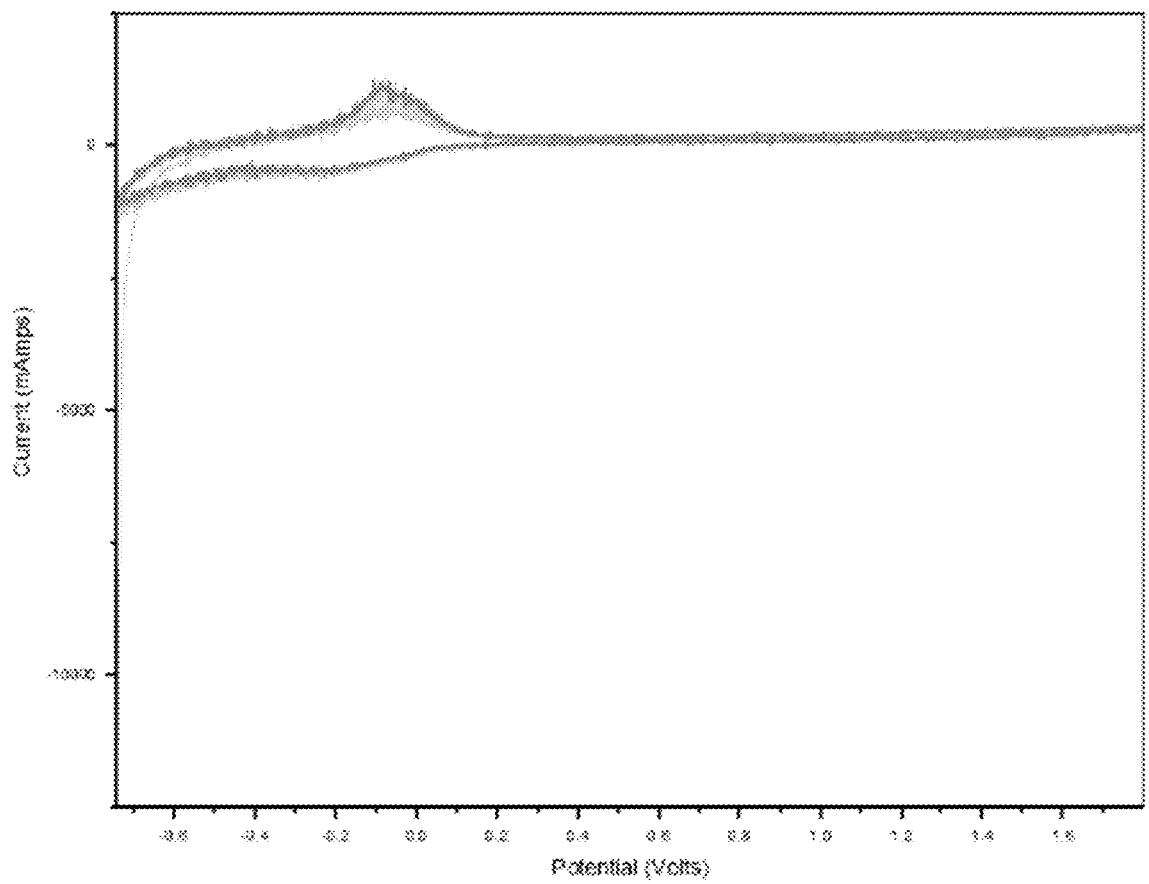

FIG. 13C-13E illustrate the raw CV graphs for equilibrium point.

The full CV forward and backward curves are significantly different in the lead acid baseline and the Attostat Au presence in the electrolyte and electrodes. However, the presence in the electrolyte appears to have the immediate effect in change. The $\alpha PbO_2$ peak in the baseline is very visible, wherein the Attostat presence does not appear to have a prevalent $\alpha PbO_2$ peek. Also, the potentials of activity are different between the baseline and the Attostat Au presence. Anodic and cathodic maximum peak currents are less in the Attostat Au presence. The integrated area under the peaks are similar. Also, the number of runs to reach equilibrium was different between the experiments, and are as follows:

Experiment 2: 12 rubs to Equilibrium
Experiment 3: 10 runs to Equilibrium
Experiment 4: 29 runs to Equilibrium The benefits of Attostat Au addition to lead acid batteries has direct impact for many energy storage uses. It is also noteworthy that several lead acid batteries that were ready for recycle due to storage capacity loss were brought back to useable, and in some cases, factory new specifications for capacity.

Example 9

Any of the foregoing examples is modified to use nonionic, ground state metal nanoparticles comprising at least one metal instead of or in addition to gold.

Example 10

Any of the foregoing examples is modified to use an amount of nonionic, ground state metal nanoparticles so that the electrolyte solution of the battery contains 5 ppm of the metal nanoparticles. Using this amount of metal nanoparticles is at least as effective as in previous Examples in rejuvenating and/or improving performance of a lead-acid battery.

Example 11

Any of the foregoing examples is modified to use an amount of nonionic, ground state metal nanoparticles so that the electrolyte solution of the battery contains 10 ppm of the metal nanoparticles. Using this amount of metal nanoparticles is at least as effective as in previous Examples in rejuvenating and/or improving performance of a lead-acid battery.

Example 12

Any of the foregoing examples is modified to use an amount of nonionic, ground state metal nanoparticles so that the electrolyte solution of the battery contains 25 ppm of the metal nanoparticles. Using this amount of metal nanoparticles is at least as effective as in previous Examples in rejuvenating and/or improving performance of a lead-acid battery.

Example 13

Any of the foregoing examples is modified to use an amount of nonionic, ground state metal nanoparticles so that the electrolyte solution of the battery contains 50 ppm of the metal nanoparticles. Using this amount of metal nanoparticles is at least as effective as in previous Examples in rejuvenating and/or improving performance of a lead-acid battery.

Example 14

Any of the foregoing examples is modified to use an amount of nonionic, ground state metal nanoparticles so that the electrolyte solution of the battery contains 100 ppm of the metal nanoparticles. Using this amount of metal nanoparticles is at least as effective as in previous Examples in rejuvenating and/or improving performance of a lead-acid battery.

Example 15

Any of the foregoing examples is modified to use nonionic, ground state metal nanoparticles in electrolytes of other types of batteries, which are not lead-acid batteries.

Example 16

An electrode paste for application to battery electrodes during manufacture or remanufacture is modified by adding Attostat Au to the paste. The battery electrode paste is made by mixing lead (II) oxide (PbO) with sulfuric acid and water to form lead sulfate compounds, including one or more of $PbO \cdot PbSO_4$ (monobasic lead sulfate), $2PbO \cdot PbSO_4$ (dibasic lead sulfate), $3PbO \cdot PbSO_4$ (tribasic lead sulfate), and $4PbO \cdot PbSO_4$ (tetrabasic lead sulfate). A binder, such as a polymer binder, can be added to the paste. Because Attostat Au is essentially inert and unreactorive, it can be added to the paste before, during or after forming the lead sulfate compounds.

The paste is used in the manufacture or remanufacture of a battery and provides the same or greater enhanced effects as described above in the previous Examples.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of rejuvenating and/or improving performance of a battery having an electrolyte solution, comprising:
providing a battery having an electrolyte solution;
adding an amount of nonionic, ground state gold nanoparticles to the electrolyte solution so as to bring the concentration of the gold nanoparticles within the electrolyte solution to at least 100 ppb and up to 100 ppm, wherein the gold nanoparticles are formed by laser ablation so as to have a smooth surface with no external bond angles or edges; and
the nonionic, ground state gold nanoparticles rejuvenating or improving the performance of the battery.

2. The method of claim 1, wherein the addition of the nanoparticles to the electrolyte solution increases a fully charged resting voltage of the battery as compared to a fully charged resting voltage of the battery prior to addition of the nanoparticles.

3. The method of claim 1, wherein the addition of the nanoparticles to the electrolyte solution increases a cranking amps or cold cranking amps rating of the battery as compared to a cranking amps or cold cranking amps rating of the battery prior to addition of the nanoparticles.

4. The method of claim 1, wherein the addition of the nanoparticles to the electrolyte solution increases a reserve capacity of the battery as compared to a reserve capacity of the battery prior to addition of the nanoparticles.

5. The method of claim 1, wherein an average cell voltage of the battery is increased to 2.6 V and/or is increased by 8 to 25%.

6. The method of claim 1, wherein the nanoparticles comprise coral-shaped nanoparticles having lengths ranging from 15 nm to 100 nm, wherein the coral-shaped nanoparticles have a non-uniform cross section, a smooth surface, and a globular structure formed by multiple, non-linear strands joined together without right angles, with no edges or corners resulting from joining of separate planes.

7. The method of claim 1, wherein the nanoparticles comprise spherical-shaped nanoparticles having a mean diameter of 3 nm to 20 nm, wherein the spherical-shaped nanoparticles have no surface edges or external bond angles.

8. The method of claim 1, wherein the nanoparticles have a concentration within the electrolyte solution of at least 100 ppb and up to 50 ppm.

9. The method of claim 1, wherein the nanoparticles have a concentration within the electrolyte solution of at least 100 ppb and up to 25 ppm.

10. The method of claim 1, wherein the nanoparticles have a concentration within the electrolyte solution of at least 100 ppb and up to 10 ppm.

11. The method of claim 1, wherein the nanoparticles have a concentration within the electrolyte solution of at least 100 ppb and up to 5 ppm.

12. The method of claim 1, further comprising recharging the lead-acid battery by applying a voltage.

13. The method of claim 1, wherein the gold nanoparticles are added using a composition consisting of the gold nanoparticles and at least one of water or sulfuric acid.

14. A lead-acid battery having improved performance, comprising:
a positive electrode;
a negative electrode;
an electrolyte in electrical contact with the positive and negative electrodes; and
a plurality of nonionic gold nanoparticles dispersed within the electrolyte at a concentration of at least 100 ppb and up to 100 ppm, wherein the gold nanoparticles are formed by laser ablation so as to have a smooth surface with no external bond angles or edges.

15. The lead-acid battery of claim 14, wherein the nanoparticles have a concentration within the electrolyte of at least 100 ppb and up to 25 ppm.

16. The method of claim 14, wherein the electrolyte consists of the gold nanoparticles and at least one of water or sulfuric acid, and optionally lead sulfate.

17. A method of manufacturing an enhanced battery electrode paste comprising:
- providing a battery electrode paste formed from lead oxide, sulfuric acid, and water to form one or more lead sulfate compounds selected from $PbO.PbSO_4$ (monobasic lead sulfate), $2PbO.PbSO_4$ (dibasic lead sulfate), $3PbO.PbSO_4$ (tribasic lead sulfate), and $4PbO.PbSO_4$ (tetrabasic lead sulfate); and
- adding nonionic, ground state gold nanoparticles to yield the enhanced battery electrode paste, wherein the gold nanoparticles are formed by laser ablation so as to have a smooth surface with no external bond angles or edges.

18. The method of claim 17, wherein the nonionic, ground state gold nanoparticles are added before, during, or after forming the one or more lead sulfate compounds.

* * * * *